United States Patent
Ryzhova et al.

(10) Patent No.: US 11,767,452 B2
(45) Date of Patent: Sep. 26, 2023

(54) CURABLE COMPOSITION, ESPECIALLY AS CRYSTALLIZING RUBBER TO SUBSTRATE BONDING PRIMER

(71) Applicant: Henkel AG & Co. KGaA, Duesseldorf (DE)

(72) Inventors: Anna Ryzhova, Eppelheim (DE); Christian Beirich, Biblis (DE); Wolfgang Weimar, Hanau (DE); Martin Hornung, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 875 days.

(21) Appl. No.: 16/558,264

(22) Filed: Sep. 2, 2019

(65) Prior Publication Data
US 2019/0382636 A1 Dec. 19, 2019

Related U.S. Application Data

(63) Continuation of application No. PCT/EP2018/054348, filed on Feb. 22, 2018.

(30) Foreign Application Priority Data

Mar. 1, 2017 (EP) .................................... 17158651

(51) Int. Cl.
| | |
|---|---|
| C08K 3/36 | (2006.01) |
| C09J 175/12 | (2006.01) |
| C09D 7/40 | (2018.01) |
| C09D 7/61 | (2018.01) |
| C09D 7/20 | (2018.01) |
| C08G 18/18 | (2006.01) |
| C08G 18/40 | (2006.01) |
| C08G 18/58 | (2006.01) |
| C08G 18/64 | (2006.01) |
| C08G 18/80 | (2006.01) |
| C08K 3/04 | (2006.01) |
| C09D 175/12 | (2006.01) |
| C09J 5/00 | (2006.01) |
| C09J 11/04 | (2006.01) |

(52) U.S. Cl.
CPC ........ *C09J 175/12* (2013.01); *C08G 18/1883* (2013.01); *C08G 18/4081* (2013.01); *C08G 18/58* (2013.01); *C08G 18/6484* (2013.01); *C08G 18/80* (2013.01); *C08K 3/04* (2013.01); *C08K 3/36* (2013.01); *C09D 7/20* (2018.01); *C09D 7/61* (2018.01); *C09D 7/69* (2018.01); *C09D 175/12* (2013.01); *C09J 5/00* (2013.01); *C09J 11/04* (2013.01); *C08K 2201/005* (2013.01); *C09J 2475/00* (2013.01)

(58) Field of Classification Search
CPC ............ C08G 18/1883; C08G 18/4081; C08G 18/6484; C08G 18/80; C08G 18/289; C08G 18/8077; C08G 18/807; C08K 3/04; C08K 3/36; C08K 2201/005; C09D 7/20; C09D 7/61; C09D 7/69; C09D 175/12; C09J 11/04; C09J 2475/00
USPC ....................................................... 156/331.7
See application file for complete search history.

(56) References Cited

U.S. PATENT DOCUMENTS

| | | | |
|---|---|---|---|
| 4,835,226 A | 5/1989 | Warren et al. | |
| 5,661,219 A * | 8/1997 | Nakane ................ | C09D 157/04 525/169 |
| 7,972,682 B2 | 7/2011 | Barthel et al. | |
| 2010/0152373 A1* | 6/2010 | Wakabayashi ....... | C09D 133/08 524/588 |
| 2016/0237282 A1* | 8/2016 | Shimura .................. | G03F 7/00 |
| 2016/0347974 A1* | 12/2016 | Nolan .................... | C08K 5/544 |
| 2018/0163101 A1* | 6/2018 | Weimar ................. | C08G 18/58 |

FOREIGN PATENT DOCUMENTS

| | | |
|---|---|---|
| CN | 1817999 A | 8/2006 |
| CN | 105670548 A | 6/2016 |
| EP | 3135740 A1 | 3/2017 |
| JP | S63170401 A | 7/1988 |
| JP | 2010285557 A | 12/2010 |
| JP | 2015535860 A | 12/2015 |
| WO | 2006/072407 A1 | 7/2006 |

OTHER PUBLICATIONS

International Search Report for PCT/EP2018/054348, dated Apr. 19, 2018.
European Search Reprot for EP 17158651.4, dated Aug. 7, 2017.
Hans-Jochen Foth, et al, editors; "Keime"; Roempp Lexikon; last update Jul. 2009. Cited in European Office Action for EP17158651. 4, dated Dec. 6, 2019. Available at: https://roempp.thieme.de/roempp4.0/do/data/RD-11-007836.
Alfredo Wuest, editor; "Impfen"; Roempp Lexikon; last update Mar. 2006. Cited in European Office Action for EP 17158651.4, dated Dec. 6, 2019. Available at: https://roempp.thieme.de/roempp4.0/do/data/RD-09-00378.

* cited by examiner

*Primary Examiner* — Hannah J Pak
(74) *Attorney, Agent, or Firm* — Mary K. Cameron

(57) ABSTRACT

The subject matter is a new composition comprising at least one hydroxyl-group containing resin, at least one nitroso-containing compound or at least one nitroso precursor compound, at least one blocked isocyanate and at least one crystallization germ suitable as primer or coating for rubber to substrate bonding, which provides a scratch resistant surface, when applied, and excellent adhesion and steam resistance for rubber to substrate bonds. These compositions can especially be used as one coat systems.

12 Claims, No Drawings

CURABLE COMPOSITION, ESPECIALLY AS CRYSTALLIZING RUBBER TO SUBSTRATE BONDING PRIMER

FIELD

The subject matter is a new composition comprising at least one hydroxyl-group containing resin, at least one nitroso-containing compound or at least one nitroso precursor compound, at least one blocked isocyanate and at least one crystallization germ suitable as primer or coating for rubber to substrate bonding, which provides a scratch resistant primer surface, when applied, and excellent adhesion and steam resistance for rubber to substrate bonds. These compositions can especially be used as one coat systems.

BRIEF DESCRIPTION OF RELATED TECHNOLOGY

The conventional state of the art for bonding rubber to metal are two coat systems. These systems have a time-consuming application process, since two layers needs to be applied. Additionally, such systems cause evaporation of cross linker during the vulcanization process, which leads to mould fouling, cuts in final product and health issues.

Additionally, one coat systems using nitroso compounds are known, but these systems either have a limited pre-bake resistance and red rust formation or they provide a limited shelf life and poor adhesion on zinc phosphate metal surfaces. One coat system often contains chlorinated polyethylene as film former. But at high temperatures chlorinated polyethylene is not stable and starts to release hydrochloric acid [HCl]. The HCl initiates the cross linking of the nitroso compound. A cross linked nitroso compound is not able any more to connect the rubber with the metal surface and consequently such systems often show poor adhesion. In addition, HCl released leads to corrosion, which leads to the formation of red rust. This is not accepted by the industrial standard.

Furthermore, the known systems of the state of the art often show a reduced aging resistance, especially steam resistance. This might be due to the above described properties of the known rubber to metal adhesives.

Additionally, it is desired that the one coat systems provide after application a scratch resistant surface. The coating shall ensure that the coated substrates can be transported in an easy and safe way. Scratches in the surface may lead to adhesion failure, reduced adhesion and/or reduced aging performance. Usually, a film former is responsible to ensure such a scratch resistant surface, but to meet the industry specification, especially for NR 40 bonding, a high amount of the nitroso compound as crosslinker in such systems is often needed. The nitroso compound is therefore the most dominant ingredient, especially since the amount of polar film former are often reduced to improve the performance in aging resistance as tested by a combi test (pre-bake plus 24 h steam resistance). But the nitroso compound is usually soft and waxy in a dried state. Therefore, one coat systems with a high amount of nitroso compounds have the problem to provide primer coatings, which are often tacky and waxy and have almost no scratch resistance.

Therefore, the problem to be solved is to provide an improved curable composition, which overcomes the above described drawbacks of the known systems. The curable composition, especially in case of one coat systems, shall provide a scratch resistant coating and at the same time the curable composition should provide an excellent adhesion between a metal and rubber substrate, showing an excellent pre-bake performance and a superior aging resistance, especially steam resistance.

DETAILED DESCRIPTION

Surprisingly this problem is solved by a curable composition comprising
a) at least one hydroxyl-group containing resin,
b) at least one nitroso-containing compound or at least one nitroso precursor compound,
c) at least one blocked isocyanate and
d) at least one crystallization germ.

Such curable compositions show beside excellent adhesion properties, especially for a rubber to metal bond, excellent pre-bake performance, a superior aging resistance, especially steam resistance, and additionally a high scratch resistance of the applied primer/coating. These compositions show on the one side a significant performance improvement after steam for hydroxyl-group containing resins, especially phenoxy/epoxy systems, which are crosslinked by the blocked isocyanates, but on the other side also a drastic improvement of the scratch resistance of the applied composition due to a crystallisation of the composition. In systems without a crystallization germ the compositions stay after application in a glassy or waxy state, even for days, which leads to almost no scratch resistance. On the other hand, curable compositions with a crystallization germ crystallize quickly after application leading to a highly scratch resistant surface.

As film former for use in the improved composition of the present invention, the composition comprises at least one hydroxy group-containing resin, preferably a non-halogenated hydroxy group-containing resin.

Preferably hydroxy group-containing resin contain in average at least two or more, preferably more than two hydroxyl groups per molecule. Suitably, the hydroxy group-containing resin has preferably a hydroxy content of from 1 to 35 wt % of the total weight of the hydroxy group-containing resin. More suitably, the hydroxy group-containing resin may have a hydroxy content of from 2 to 30 wt % of the total weight of the hydroxy group-containing resin, more preferably from 4 to 15 wt % of the total weight of the hydroxy group-containing resin.

As suitable hydroxyl-group-containing resins, polymers such as polyvinyl alcohol, polyvinyl butyral, poly-cellulose acetate butyrate, polyvinyl formal, polyamide, polyester, phenol resin, epoxy resin and phenoxy resin may be used, which exhibit superior stress relaxation properties at the time of curing and bring about an improvement in adhesion attributable to hydroxyl groups.

A suitable resin is obtained by allowing a bifunctional phenol, like bisphenol A, to react with an epihalohydrin, like epichlorohydrin, to have a high molecular weight, or subjecting a bifunctional epoxy resin and a bifunctional phenol to polyaddition reaction. Stated specifically, it can be obtained by allowing 1 mole of a bifunctional phenol to react with 0.985 to 1.015 mole of an epihalohydrin in the presence of an alkali metal hydroxide, in a non-reactive solvent and at a temperature of from 40 to 120° C. In view of mechanical properties and thermal properties of the resin, particularly preferred is a resin obtained using a bifunctional epoxy resin and a bifunctional phenol which are mixed in an equivalent weight ratio of epoxy group/phenolic hydroxyl group=1/0.9 to 1/1.1, and by subjecting them to polyaddition reaction in the presence of a catalyst such as an alkali metal compound, an organic phosphorus compound or a cyclic amine compound, in an organic solvent having a boiling point of 120° C. or above of such as amides, ethers, ketones, lactones or alcohols, and at a reaction solid matter concentration of 50% by weight or less while heating the system to 50 to 200° C.

The bifunctional epoxy resin may include bisphenol-A epoxy resin, bisphenol-F epoxy resin, bisphenol-AD epoxy resin, bisphenol-S epoxy resin, and alkylene oxide addition products, as well as alicyclic epoxy resins, aliphatic chain epoxy resins and halides or hydrogenation products of these.

The bifunctional phenol may be any phenols so long as they are compounds having two phenolic hydroxyl groups, as exemplified by monocyclic bifunctional phenols such as hydroquinone, 2-bromohydroquinone, resorcinol and catechol, bisphenols such as bisphenol A, bisphenol F, bisphenol AD and bisphenol S, dihydroxybiphenyls such as 4,4'-dihydroxybiphenyl, dihydroxyphenyl ethers such as bis(4-hydroxyphenyl) ether, and any of these compounds into the aromatic ring of the phenolic skeleton of which a straight-chain alkyl group, a branched alkyl group, an aryl group, a methylol group, an allyl group, a cyclic aliphatic group, and also polycyclic bifunctional phenols formed by introducing a straight-chain alkyl group, a branched alkyl group, an allyl group, an ally group with a substituent, a cyclic aliphatic group or an alkoxycarbonyl group into the carbon atom present at the center of the bisphenolic skeleton of any of these compounds.

Stated specifically, the bifunctional phenol may include 4,4'-(1-methylethylidene)bis[2-methylphenol], 4,4'-methylenebis[2-methylphenol], methylethylidene)bis[2-(1-methylethyl)phenol], 4,4'-(1-methylethylidene)bis[2-(1,1-methylpropyl)phenol 4,4'-(1-methylethylidene)bis[2-(1,1-dim ethylethyl)phenol], tetramethylbisphenol A, tetramethylbisphenol F, 4,4'-methylenebis[2,6-bis(1,1-dimethylethyl)phenol], 4,4'-(1-methylethylidene)bis[2,6-di(1,1-dimethylethyl) phenol], 4,4'-(1-methylethylidene)bis[2-(2-propenyl)ph enol], 4,4'-methylenebis[2-(2-propenyl(phenol), 4,4'-(1-methylethylidene)bis[2-(1-phenylethyl)phenol], 3,3'-dimethyl[1,1'-biphenyl]-4,4'-diol, 3,3',5,5'-tetramethyl[1,1'-biphenyl]-4,4'-diol, 3,3',5,5'-tetra-t-butyl[1,1'-biphenyl]-4,4'-diol, 3,3'-bis(2-propenyl)-[1,1'-biphenyl]-4,4'-diol, 4,4'-(1-methylethylidene)bis[2-methyl-6-hydroxymethylphenol], tetramethylolbisphenol A, 3,3',5,5'-tetrakis(hydroxymethyl)-(1,1'-biphenyl)-4,4'-diol, 4,4'-(1-methylethylidene)bis[2-phenylphenol], 4,4'-(1-methylethylidene)bis[2-cyclohexylphenol], 4,4'-methylenebis(2-cyclohexyl-5-methylphenol], 4,4'-(1-methylpropylidene)bisphenol, 4,4'-(1-methylheptylidene)bisphenol, 4,4'-(1-methyloctylidene)bisphenol, 4,4'-(1,3-dimethylbutylidene)bisphenol, 4,4'-(2-ethylhexylidene)bisphenol, 4,4'-(2-methylpropylidene) bisphenol, 4,4'-propylidenebisphenol, 4,4'-(1-ethylpr opylidene)bisphenol, 4,4'-(3-methylbutylidene)bisphenol, 4,4'-(1-phenylethylidene)bisphenol, 4,4'-(phenylmethylene) bisphenol, 4,4'-(diphenylmethylene)bisphenol, 4,4'-[1-(4-nitrophenyl)ethylidene]bisphenol, 4,4'-[1-(4-aminophenyl) ethylidene]bisphenol, 4,4'-(4-bromophenyl)methylene bisphenol, 4,4'-(4-chlorophenyl)methylenebisphenol, 4,4'-(4-fluorophenyl)methylenebisphenol, 4,4'-(2-methylpropylidene)bis[3-methyl-6-(1,1-dimethylethyl)phenol], 4,4'-(1-ethylpropylidene)bis[2-methylphenol], phenylethylidene) bis[2-methylphenol], 4,4'-(phenylmethylene)bis-2,3,5-tr imethylphenol, 4,4'-(phenylethylidene)bis[2-(1,1-dimethylethyl)phenol], methylpropylidene)bis[2-cyclohexyl-5-methylphenol], 4,4'-(1-phenylethylidene)bis[2-phenylphenol], 4,4'-butylidenebis[3-methyl-6-(1,1-dimethylethyl)phenol], 4-hydroxy-alpha-(4-hydroxyphenyl-alpha-methylbenzene acetic acid methyl ester, 4-hydroxy-alpha-(4-hydroxyphenyl-alpha-methylbenzene acetic acid ethyl ester, 4-hydroxy-alpha-(4-hydroxyphenyl)benzene acetic acid butyl ester, and the like.

The polycyclic bifunctional phenols other than these may include 1,4-naphthalene diol, 1,5-naphthalene diol, 1,6-naphthalene diol, 1,7-naphthalene diol, 2,7-naphthalene diol, 4,4'-dihydroxydiphenyl ether, bis(4-hydroxyphenyl) methanone, 4,4'-cyclohexylidenebisphenol, 4,4'-cyclohexylidenebis[2-methylphenol], 4,4'-cyclopentylidenebisphenol, 4,4'-cyclopentylidenebis[2-methylphenol], 4,4'-cyclohexylidene[2,6-dimethylphenol], 4,4'-cyclohexylidenebis [2-(1,1-dimethylethyl)phenol], 4,4'-cyclohexylidenebis[2-cyclohexylphenol], 4,4'-(1,2-ethanediyl)bisphenol, 4,4'-cyclohexylidenebis[2-phenylphenol], 4,4'-[1,4-phenylenebis(1-methylethylidene)]bis[2-methyl]phenol, 4,4'-[1,3-phenylenebis(1-methylethylidene)]bisphenol, 4,4'-[1,4-phenylenebis(1-methylethylidene)]bisphenol, 4,4'-[1,4-phenylenebis(1-methylethylidene)]bis[2-methyl-6-hydroxymethylphenol], 4-{1-[4-(4-hydroxy-3-methylphenyl)-4-methylcyclohexyl]-1-methylethyl}-2-methylphenol, 4-{1-[4-(4-hydroxy-3,5-dimethylphenyl)-4-methylcyclohexyl]-1-methylethyl}-2,6-dimethylphenol, ethanediyl)bis[2,6-di-(1,1-dimethylethyl)phenol].

Most preferably the hydroxyl-group containing resin is selected from epoxy resins and phenoxy resins, especially from epoxy resins and phenoxy resins based on a bisphenol.

These hydroxy group-containing polymers may preferably have a number average molecular weight of 1000 or more, preferably 2000 or more, but those having a molecular weight of 1000000 or more tend to have poor mixing properties. Preferably the number average molecular weight of the hydroxyl-group-containing resin is in the range of 1000 to 100000, preferably 2000 to 50000, more preferably 4000 to 25000 g/mol. The number average molecular weight Mn is measured via the standard procedure with GPC against a polystyrene standard.

As the hydroxyl-group containing resin, it is preferred to use a hydroxyl-group containing resin having a Tg (glass transition temperature) of 40° C. or above (measured with DSC), preferably a Tg between 40 and 250° C., more preferably a Tg between 60 and 200° C., most preferably between 80 and 170° C.

The at least one hydroxy group-containing resin, especially the epoxy resins and phenoxy resins, may be preferably present in the composition of the invention in a range of from 0.5 to 20 wt %, preferably 1 to 15 wt %, more preferably 2 to 10 wt %, most preferably 2 to 5 wt % of the total weight of the curable composition.

Especially preferred are epoxy resin, since these resins can be used with a higher amount of organic solvents with a low evaporation point.

In this context it is preferred that the improved curable composition of the present invention is substantially free of chlorinated polyesters, especially substantially free of chlorinated polyolefins and/or polyesters, preferably substantially free of halogenated polyolefins and/or polyesters, most preferred substantially free of halogenated polymers. The term "halogenated" includes especially fluorinated, brominated, chlorinated, and mixed-halogen substituted compounds comprising two or more different types of halogen atoms, such as bromine and chlorine. The term "substantially free" means that the improved curable composition of the present invention comprises less than 1 wt.-%, preferably less than 0.1 wt.-%, more preferably less than 0.01 wt.-%, and particularly preferably less than 0.001 wt.-% of these compounds, each based on the total amount of the inventive improved curable composition.

Additionally, to the preferred hydroxyl-group containing resin selected from phenoxy and/or epoxy resins the curable composition may additionally comprise a second hydroxyl-group containing polymer. Suitably, the second hydroxyl group-containing resin includes a (co)polymer, which is a polymer of at least one of polyvinyl alcohol, polyvinyl butyral and polycellulose acetate butyrate. Preferably, the curable composition contains a polycellulose acetate butyrate. Preferably this second hydroxy group-containing resin has a hydroxy content of from 1 to 4 wt % of the total weight of this hydroxy group-containing resin.

Desirably, such a hydroxyl group-containing resin has the general structure:

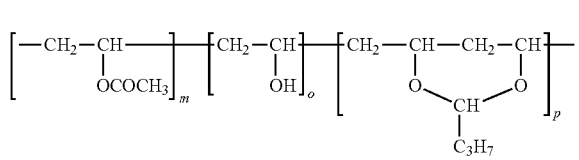

wherein each of n, o and p is at least 5, and the combined % wt of the m, o and p components in the non-halogenated hydroxyl group-containing resin is 100%.

Suitably, a preferred polycellulose acetate butyrate polymer has the general structure:

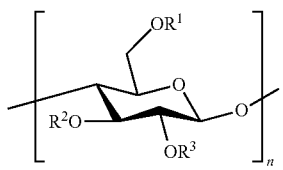

wherein $R^1$, $R^2$, $R^3$ are independently selected from acetyl, butyryl or H, and n is an integer greater than 10.

The second hydroxy group-containing resin, especially the polycellulose acetate butyrate, may be present in the composition of the invention in a range of from 0.1 to 5 wt %, preferably 0.3 to 2 wt % of the total weight of the curable composition.

Additionally, to the hydroxyl-group containing resin the curable composition contains at least one nitroso-containing compound or at least one nitroso precursor compound, especially at least one nitroso-containing compound, especially preferred at least one nitroso-containing compound having a silane- and nitroso-moiety (nitrososilane). The term "nitroso-containing compound", as used herein, refers to any compound which comprises at least one nitroso functional group *—N=O. Preferably the at least one nitroso-containing compound or at least one nitroso precursor compound is present in the composition in a range of from 1 to 30 wt %, especially 3 to 25 wt %, more preferably 5 to 20 wt % of the total weight of the curable composition.

Preferably the nitroso-containing compound or the nitroso precursor compound are an aromatic nitroso or at least one aromatic nitroso precursor compound, respectively. It is to be appreciated that the term aromatic nitroso moiety refers to an aromatic moiety having at least one nitroso group. Similarly, the term aromatic nitroso precursor moiety refers to any compound that is capable of being transformed into an aromatic nitroso moiety with at least one nitroso group. Preferred aromatic nitroso precursors are oximes. The term aromatic comprises both fused and non-fused aromatic rings.

For example, a non-limiting selection of fused and non-fused aromatic nitroso moieties embraced by the present invention are detailed below:

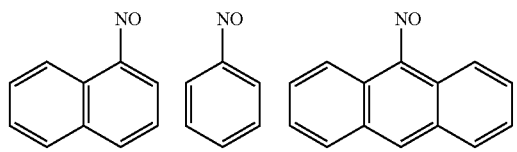

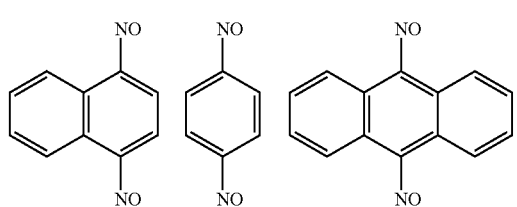

As will be appreciated by a person skilled in the art, the nitroso compounds or structures disclosed above may optionally be substituted one or more times, for example with at least one of $C_1$-$C_{20}$ alkyl, $C_1$-$C_{20}$ cycloalkyl, $C_1$-$C_{20}$ alkoxy, $C_7$-$C_{20}$ aralkyl, $C_7$-$C_{20}$ alkaryl, $C_6$-$C_{20}$ arylamine, $C_6$-$C_{20}$ arylnitroso, cyano, amino, hydroxy, halogen and combinations thereof. Such substitutions are possible provided there is no interference with effective bonding or curing of the compositions.

The at least one moiety selected from an aromatic nitroso or an aromatic nitroso precursor and combinations thereof may be selected from a nitrosobenzene or a nitrosobenzene precursor and combinations thereof.

Desirably, the nitrosobenzene compound may be a mono-nitrosobenzene compound, a dinitrosobenzene compound, or combinations thereof. Aromatic nitroso compound is selected from the group consisting of m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof.

Desirably compositions of the present invention find utility in bonding a substrate to a natural or synthetic rubber. Especially, the compositions are used for applications where bonding metal to natural or synthetic rubber is required. The inventive composition provides for such bonding superior properties.

Suitably, the improved compositions of the present invention will provide for in-situ generation of a nitrosobenzene moiety or a dinitrosobenzene moiety. For example, to achieve good bonding it may be desirable for the compound to react in-situ to form a nitroso aromatic moiety comprising a hydroxy group. The nitroso aromatic moiety comprising a hydroxy group may be a para-nitrosophenol moiety. The phenolic moiety present may help to anchor the para-nitrosophenol moiety to a metal surface. para-Nitrosophenol may be generated in-situ from the oxidation of quinone mono-oxime as shown below for information purposes:

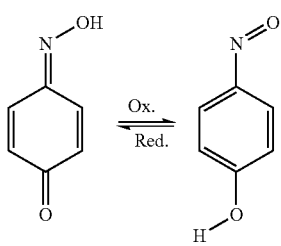 [SMILES: O=C1C=CC(=NO)C=C1 ; O=Nc1ccc(O)cc1]

As will be appreciated by a person skilled in the art, references to nitrosobenzene and nitrosobenzene precursor moieties include nitrosobenzene and nitrosobenzene precursor moieties that may optionally be substituted one or more times with at least one of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_6$-$C_{20}$ arylamine, $C_5$-$C_{20}$ arylnitroso, cyano, amino, hydroxy, halogen and combinations thereof. Such substitutions are possible provided there is no interference with effective bonding or curing of the compositions. For example, provided there is no interference with the generation of a nitrosobenzene moiety in-situ.

It will be appreciated that the nitrosobenzene precursor may form a nitrosobenzene structure in-situ. The nitrosobenzene precursor may be an aromatic oxime, for example at least one of a quinone dioxime or a quinone oxime or combinations thereof. Desirably, the aromatic nitroso compound precursor is selected from the group consisting of p-benzoquinone dioxime (QDO), naphthoquinone dioxime, toluquinone dioxime, diphenoquinone dioxime, diquinoyl dioxime, dibenzoyl dioxime and combinations thereof. The above list serves as a generalised example only and other aryl oximes and dioximes are possible and embraced by the present invention. Desirably, the nitrosobenzene precursor comprises p-benzoquinone oxime or p-benzoquinone dioxime (QDO). QDO is generally used as a vulcanizing agent for EPDM (ethylene-propylene diene monomer) to improve heat resistance.

It is also used as a rubber to metal adhesion promoter and as a curing agent. It has been found that such structures assist in the formation of desirable bonds.

A general scheme for the oxidation of quinone dioxime to the dinitrosobenzene species using an oxidant, such as benzoyl peroxide (BPO), is shown below, for information purposes:

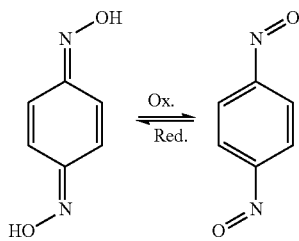 [SMILES: ON=C1C=CC(=NO)C=C1 ; O=Nc1ccc(N=O)cc1]

The at least one aromatic nitroso compound precursor may be present in an amount of 1 to 30 wt % of the total composition. Suitably, the at least one aromatic nitroso compound precursor may be present in an amount of 3 to 25 wt %, for example 5 to 20 wt %. Preferably an oxidant, like a peroxide, such as benzoyl peroxide, is present in the composition if a nitroso precursor compound is used. The amount of the oxidant is preferably sufficient to oxidize the whole nitroso precursor compound, preferably equivalent.

For example, the aromatic nitroso precursor moiety may be the mono- or dioxime of a compound selected from:

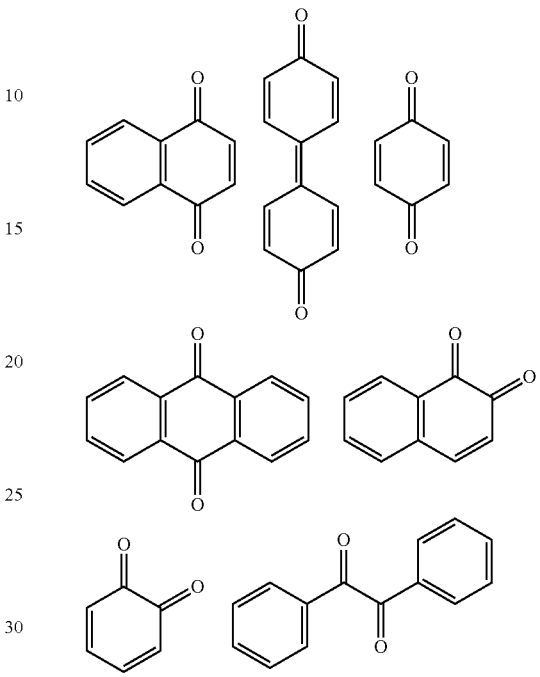

As will be appreciated by a person skilled in the art, the diketone structures disclosed above may optionally be substituted one or more times, for example with at least one of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_6$-$C_{20}$ arylamine, $C_6$-$C_{20}$ arylnitroso, cyano, amino, hydroxy, halogen and combinations thereof. Such substitutions are possible provided there is no interference with effective bonding or curing of the compositions, for example, with the generation of an aromatic nitroso compound in-situ.

As will be appreciated by a person skilled in the art, references to nitrosobenzene and nitrosobenzene precursor moieties include nitrosobenzene and nitrosobenzene precursor moieties that may optionally be substituted one or more times with at least one of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_6$-$C_{20}$ arylamine, $C_6$-$C_{20}$ arylnitroso, cyano, amino, hydroxy, halogen and combinations thereof. Such substitutions are possible provided there is no interference with effective bonding or curing of the compositions. For example, provided there is no interference with the generation of a nitrosobenzene moiety in-situ.

Especially preferred in the improved composition of the invention, the above mentioned nitrososilane compounds may have an alkoxy silane moiety of the general structure:

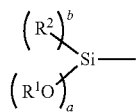

wherein a is from 1 to 3, b is from 0 to 2, with the proviso that a+b=3; each $R^1$ is independently selected from the group consisting of H, $C_1$-$C_{24}$ alkyl, and $C_3$-$C_{24}$ acyl, preferably from $C_1$-$C_4$ alkyl and wherein when a≥1 at least one $R^1$ is not hydrogen; and each $R^2$ is independently selected from the group consisting of $C_1$-$0_{24}$ alkyl and $C_3$-$C_{24}$ acyl, preferably from $C_1$-$C_4$ alkyl.

In one embodiment, a is 3 and $R^1$ is $C_1$-$C_{24}$ alkyl. $R^1$ may be $C_1$-$C_4$ alkyl and a may be 3.

The compounds may be reaction products derived from an isocyanate or isothiocyanate and an active hydrogen compound, such as —$NH_x$ (where x=1 or 2), —SH, or —OH. In this manner the so-described compounds should contain at least one linkage described by:

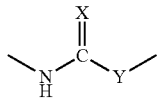

where X can be S or O, and Y includes —$NH_x$ (where x=1 or 2), —S, or —O.

The general structure for the compounds is shown below:

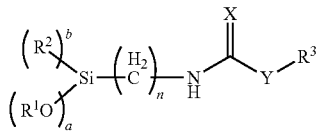

wherein n is from 1 to 20; a is from 1 to 3, b is from 0 to 2, with the proviso that a+b=3; each $R^1$ is independently selected from the group consisting of H, $C_1$-$C_{24}$ alkyl, and $C_3$-$C_{24}$ acyl, preferably from $C_1$-$C_4$ alkyl and wherein when a≥1 at least one $R^1$ is not hydrogen; each $R^2$ is independently selected from the group consisting of $C_1$-$C_{24}$ alkyl and $C_3$-$C_{24}$ acyl, preferably from $C_1$-$C_4$ alkyl; X is O or S; Y is O, S, or $N(R^3)$; and $R^3$ is a moiety comprising a nitroso group or nitroso precursor group, preferably nitrosobenzene, quinone oxime or quinone dioxime. $R^3$ is preferably a moiety comprising nitrosobenzene.

Structures for $R^3$, showing the linkage through 'Y', can include:

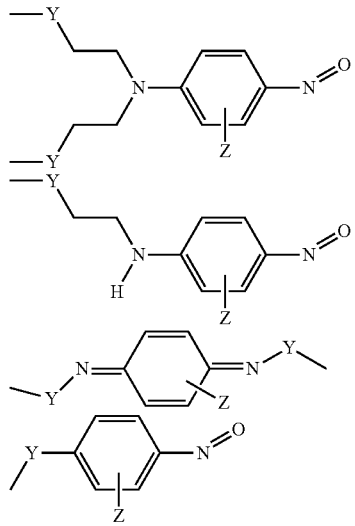

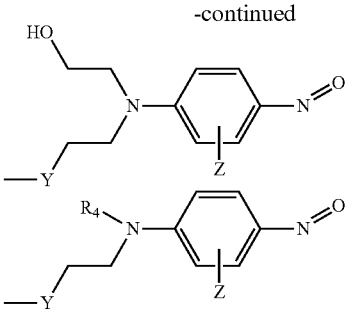

where $R_4$ can be $C_1$ to $C_{10}$ residue, preferably alkyl; and

Z indicates that the rings of the above structures can optionally be mono-, di-, tri- or tetrasubstituted with the group consisting of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_5$-$C_{20}$ arylamine, $C_5$-$C_{20}$ arylnitroso, amino, hydroxy, halogen and combinations thereof, and further where the substituents can either be the same or different on each carbon atom of the ring. Z is especially selected in a way so that the above-mentioned aromatic nitroso moieties can be achieved. Such substitutions may be possible provided there is no interference with effective bonding or curing of the compositions. For example, provided there is no interference with the generation of a nitrosobenzene compound in-situ.

One exemplary, the compound utilised one composition of the present invention may have the general structure:

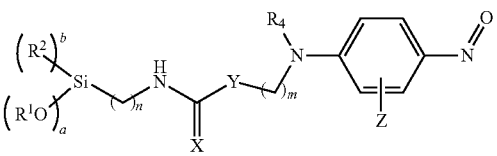

where 'a' can be 1-3 and 'b' can be 0-2; wherein a+b=3 and at least one alkoxy group is present;

$R_1$ can be selected from H, $C_1$-$C_{24}$ alkyl, $C_3$-$C_{24}$ acyl, preferably from $C_1$-$C_4$ alkyl and where when a≥1 at least one $R_1$ is not hydrogen; and $R_2$ can be selected from $C_1$-$C_{24}$ alkyl and $C_3$-$C_{24}$ acryl, preferably from $C_1$-$C_4$ alkyl;

m and n can be the same or different and can be 1-10;

X can be O or S;

Y can be —O, —S, or —NH;

$R_4$ can be $C_1$ to $C_{10}$ residue, preferably alkyl; and

Z indicates that the rings of the above structures can optionally be mono-, di-, tri- or tetrasubstituted with the group consisting of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_5$-$C_{20}$ arylamine, $C_5$-$C_{20}$ arylnitroso, amino, hydroxy, halogen and combinations thereof, and further wherein the substituents can either be the same or different on each carbon atom of the ring. Z is especially selected in a way so that the above-mentioned aromatic nitroso moieties can be achieved. Such substitutions may be possible provided there is no interference with effective bonding or curing of a bonding composition comprising the compound.

$R^1$ may be selected from $C_1$-$C_{24}$ alkyl or $C_3$-$C_{24}$ acyl. $R_1$ may be selected from $C_1$-$C_{24}$ alkyl, $C_3$-$C_{24}$ acyl and 'a' may be 3. X may be O. Y may be O or NH. Y may be O. X and Y may be O. n may be $C_2$-$C_5$ alkyl. m may be $C_2$-$C_5$ alkyl. $R_1$ may be selected from $C_1$-$C_4$ alkyl, X may be O and 'a' is 3. $R_1$ may be selected from $C_1$-$C_4$ alkyl, X may be O, Y may be O and 'a' may be 3. $R_1$ may be selected from $C_1$-$C_4$ alkyl, X may be O, Y may be NH and 'a' may be 3. $R_1$ may be selected from $C_1$-$C_4$ alkyl, X may be O, Y may be O, 'a' may be 3 and $R_4$ may be $C_1$ to $C_{10}$.

Desirably, the compounds in the above-mentioned composition of the present invention may have the general structure:

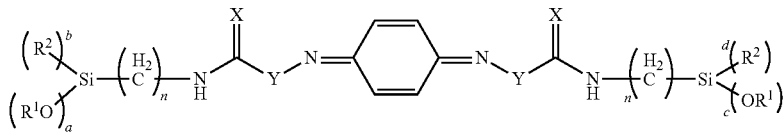

where n can be 1-10;

'a' can be 1-3 and 'b' can be 0-2; wherein a+b=3 and at least one alkoxy group is present;

c can be 'a' or 1 to 3; d can be 'b' or 1 to 3;

$R^1$ can be selected from H, $C_1$-$C_{24}$ alkyl, $C_3$-$C_{24}$ acyl, preferably from $C_1$-$C_4$ alkyl and where when a 1 at least one $R^1$ is not hydrogen;

$R^2$ can be selected from $C_1$-$C_{24}$ alkyl and $C_3$-$C_{24}$ acyl, preferably from $C_1$-$C_4$ alkyl;

X can be O or S; and

Y can be —O—, —S—, or —$NH_x$ (where x=1 or 2).

$R^1$ may be selected from $C_1$-$C_{24}$ alkyl, $C_3$-$C_{24}$ acyl. $R^1$ may be selected from $C_1$-$C_{24}$ alkyl, $C_3$-$C_{24}$ acyl and 'a' may be 3. X may be O. Y may be O or —$NH_x$ (where x=1). Y may be O. X and Y may be O. $R^1$ may be selected from $C_1$-$C_4$ alkyl, X may be O and 'a' is 3. $R^1$ may be selected from $C_1$-$C_4$ alkyl, X may be O, Y may be O and 'a' may be 3. $R^1$ may be selected from $C_1$-$C_4$ alkyl, X may be O, Y may be —$NH_x$ (where x=1) and 'a' may be 3. $R^1$ may be selected from $C_1$-$C_4$ alkyl, X may be O, Y may be O, n may be 3 and 'a' may be 3.

In a further embodiment, the above described compound of the above improved composition of the present invention may be an oligomeric or co-oligomeric compound of the general structure:

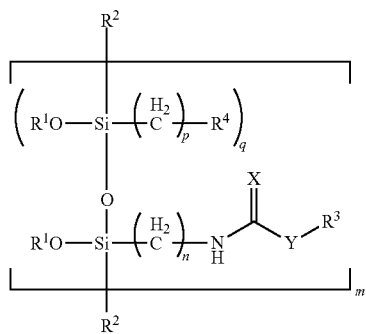

where m can be 1-100; n can be 1-10; p can be 1-10; q can be 0-50; and if q=0, m≥2;

$R^1$ can be selected from H, $C_1$-$C_{24}$ alkyl, $C_3$-$C_{24}$ acyl, and preferably from $C_1$-$C_4$ alkyl;

$R^2$ can be selected from $OR^1$, $C_1$-$C_{24}$ alkyl and $C_3$-$C_{24}$ acyl, and where when $R^2$=$OR^1$ at least one $R^1$ is not hydrogen;

$R^4$ can be selected from acrylate, aldehyde, amino, anhydride, azide, maleimide, carboxylate, sulphonate, epoxide, ester functional, halogens, hydroxyl, isocyanate or blocked isocyanate, sulfur functional, vinyl and olefin functional, or polymeric structures;

X can be O or S;

Y can be —O—, —S—, or —$NH_x$ (where x=1 or 2); and $R^3$ may be a moiety comprising nitrosoaromatic, or a nitrosoaromatic precursor as defined herein.

$R^3$ may be a moiety comprising nitrosobenzene, quinone dioxime or quinone oxime.

$R^1$ may be selected from $C_1$-$C_{24}$ alkyl, $C_3$-$C_{24}$ acyl. $R^1$ may be selected from $C_1$-$C_{24}$ alkyl, $C_3$-$C_{24}$ acyl and $R^2$ may be $OR^1$. X may be O. Y may be O or —$NH_x$ (where x=1). Y may be O. X and Y may be O. $R^1$ may be selected from $C_1$-$C_4$ alkyl, X may be O and $R^2$ may be $OR^1$. $R^1$ may be selected from $C_1$-$C_4$ alkyl, X may be O, Y may be O and $R^2$ may be $OR^1$. $R^1$ may be selected from $C_1$-$C_4$ alkyl, X may be O, Y may be —$NH_x$ (where x=1) and $R^2$ may be $OR^1$. $R^1$ may be selected from $C_1$-$C_4$ alkyl, X may be O, Y may be O, n may be 3, $R^2$ may be $OR^1$ and $R^3$ may be a moiety comprising nitrosobenzene. R' may be selected from $C_1$-$C_4$ alkyl, X may be O, Y may be O, n may be 3, $R^2$ may be $OR^1$, $R^3$ may be a moiety comprising nitrosobenzene, q may be O, and m may be ≥2. $R^1$ may be selected from $C_1$-$C_4$ alkyl, X may be O, Y may be O, n may be 3, $R^2$ may be $OR^1$, $R^3$ may be a moiety comprising nitrosobenzene, q may be O, m may be ≥2, and $R^4$ may be vinyl or ester.

Specific examples of the above mentioned nitrososilane compounds used in the improved compositions of one embodiment of the present invention may include the following:

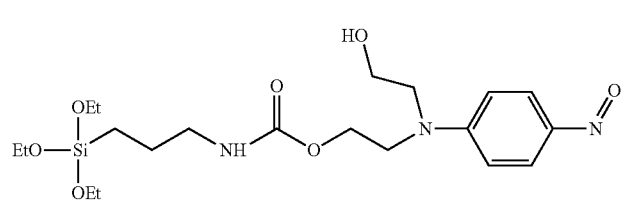

(A)

-continued

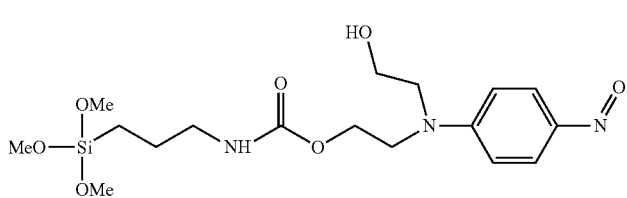

(B)

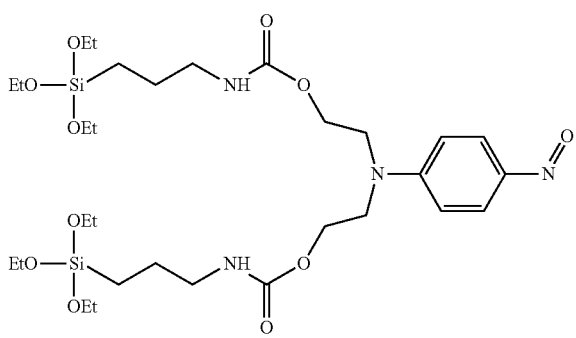

(C)

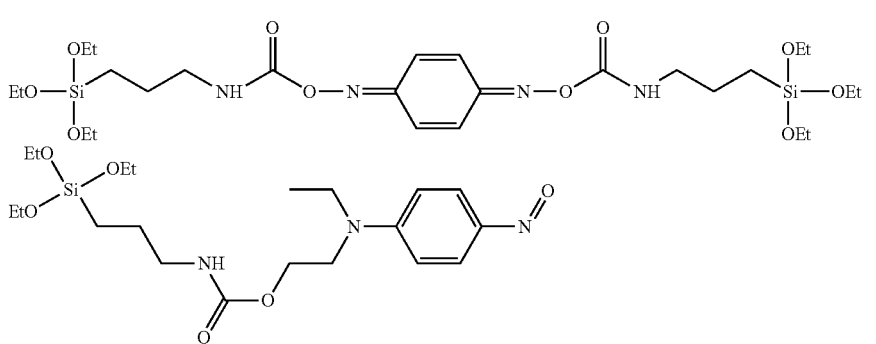

(D)

Desirably, the improved compositions of the present invention may comprise the following compound:

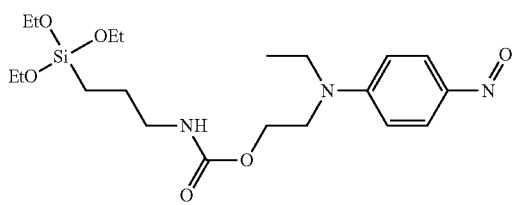 [SMILES: CCO[Si](CCCNC(=O)OCCN(CC)c1ccc(N=O)cc1)(OCC)OCC]

In the improved composition of the invention described above, the nitroso compound comprising the at least one alkoxy silane moiety and the at least one moiety selected from an aromatic nitroso or an aromatic nitroso precursor, especially an aromatic nitroso (also referred to as a nitrososilane) may be present in an amount of 1 to 60 wt % of the total composition. Suitably, the at least one aromatic nitroso compound, especially the nitrososilane, may be present in an amount of 5 to 50 wt %, for example, from 10 to 40 wt %, most preferably 20 to 30 wt % based on the total composition.

In a further aspect, the invention provides for an improved bonding composition comprising at least one aromatic nitroso compound precursor and at least one oxidant for the aromatic nitroso compound precursor, wherein at least one of the precursors and the oxidant are encapsulated. The oxidant may be encapsulated. Alternatively, both the precursor and the oxidant may be encapsulated.

An encapsulated aromatic nitroso compound or encapsulated aromatic nitroso compound precursor may be present in an amount of 1 to 60 wt % of the total composition. Suitably, the encapsulated aromatic nitroso compound or encapsulated aromatic nitroso compound precursor may be present in an amount of 5 to 50 wt %, for example, from 10 to 40 wt %, most preferably 20 to 30 wt % based on the total composition.

It will also be appreciated that where the improved compositions of the invention also comprise compounds having both alkoxy silane moiety and aromatic nitroso or an aromatic nitroso precursor moieties in the same molecule, as such compositions will assist in the formation of excellent polymer to substrate bonds, and in particular, the formation of rubber to metal bonds. Advantageously, inclusion of such dual moiety compounds (mentioned as nitrososilanes) in the improved composition of the invention, preferably together with sulfur impregnated particulate solid or carbon black (see below), assist in development of particularly durable and resistance bonds during the curing process. One advantage arising from use of nitrososilanes in curing compositions is that the compositions may be less toxic compared to conventional dinitrosobenzenes formulations (preferably no free or unethered nitrosobenzene compounds are formulated within the composition). Furthermore, inclusion of these nitrososilane compounds may also facilitate formulation of one part improved curable composition systems via conventional application techniques, such as spraying and dipping. One part systems can be readily applied to substrates in a single step using these convenient and conventional techniques. Compositions of the present invention may also be two-part compositions, but preferably the present composition are used as one part system.

The curable composition contains at least one blocked isocyanate. Blocked isocyanates are isocyanates in which the isocyanate groups have reacted with a protecting or blocking agent to form a derivative which will dissociate on heating to remove the protecting or blocking agent and release the reactive isocyanate group. The blocked isocyanates shall be substantially free of free (or non reacted) isocyanate groups. The term "substantially free" means here that the blocked isocyanate contains less than 1 wt.-%, preferably less than 0.1 wt.-%, more preferably less than 0.01 wt.-%, and particularly preferably less than 0.001 wt.-% of free NCO groups, preferably no free NCO groups. In this context it is clear for a skilled person that a dimer or trimer of an bifunctional isocyanate, like hexamethylene diisocyanate (HDI), still contains free NCO groups and cannot be considered as blocked isocyanate. In case the dimer or trimer of the bifunctional isocyanate would be further reacted with a protecting or blocking agent, this compound would be a blocked isocyanate in the meaning of this invention.

Especially due to the use of blocked isocyanate, the adhesive film in a vulcanization bonding stays at the desired location and is not pushed away during the vulcanization process. This leads to improved adhesion results. Additionally, the blocked isocyanate might cross link the OH-groups of the epoxy film during curing, the molecular weight of the matrix is increased and the film cannot be pushed away. The blocked isocyanate preferably does not contain a nitroso moiety.

Examples of blocking agents or thermally active blocking groups for polyisocyanates include aliphatic, cyclo-aliphatic or aralkyl monohydric alcohols, hydroxylamines and ketoximes. Other examples of applicable blocking agent functionalities include oximes, pyrazoles, phenols and caprolactams.

The thermally active blocking group is any group which provides a blocked polyisocyanate which remains stable at ambient temperatures, such as 20 to 25° C., for instance about 23° C., but which unblocks on heating, for example on heating to a temperature above 80° C. preferably up to about 130° C., for instance up to 120, 115 or 110° C. under practical conditions. The unblocking temperature may also be determined under experimental conditions in the absence of active hydrogen compounds by IR spectroscopic techniques, and under such conditions is suitably above 60 deg. C., for instance above 70 or 80° C. and may be up to 110° C., more preferably up to 105 or 100° C. Thus, a thermally active blocking group will release isocyanates on heating even if there is no curative agent present.

For example, the blocking agents may be chosen from 1,3 dicarbonyl compounds, especially from malonates such as diethyl malonate (DEM), dimethyl malonate, diisopropyl malonate, di(n-propyl) malonate, di(n-butyl) malonate, ethyl (n-butyl) malonate, methyl(n-butyl) malonate, ethyl(t-butyl) malonate, methyl(t-butyl) malonate, diethyl methylmalonate, dibenzyl malonate, diphenyl malonate, benzylmethyl malonate, ethylphenyl malonate, (t-butyl)phenyl malonate and isopropylidene malonate (Meldrum's acid); acetyl acetone; and acetoacetic esters such as methyl acetoacetate, ethyl acetoacetate, isopropyl acetoacetate, n-propyl acetoacetate, t-butyl acetoacetate, n-butyl acetoacetate, benzyl acetoacetate and phenyl acetoacetate. Preferred such blocking groups are derived from diethyl malonate, dimethyl malonate, Meldrum's acid and ethyl acetoacetate, most preferably diethyl malonate.

Other preferred thermally active blocking agents are chosen from pyrazoles such as 3,5-dimethylpyrazole, 3,5-diethyl pyrazole, 3-methylpyrazole, pyrazole and 3-iso-butyl-5-tert-butyl-pyrazole, 3-iso-butyl-5-methyl-pyrazole and 3,5-di-tert-butyl-pyrazole, imidazoles; triazoles such as 1,2,4 triazole and 3,5-dimethyltriazole; methylethyl ketoxime and the pyrazoline and pyrazolinone blocking agents.

Particularly preferred branched alkyl pyrazoles are 3-methyl-5-iso-propyl pyrazole, 3-iso-butyl-5-methyl pyrazole, 3-sec-butyl-5-methyl pyrazole, 3-tert-butyl-5-methyl pyrazole, 3-ethyl-5-iso-propyl pyrazole, 3-iso-butyl-5-ethyl pyrazole, 3-sec-butyl-5-ethyl pyrazole, 3-tert-butyl-5-ethyl pyrazole, 3-iso-propyl-5-n-propyl pyrazole, 3-iso-butyl-5-n-propyl pyrazole, 3-sec-butyl-5-n-propyl pyrazole, 3-tert-butyl-5-n-propyl pyrazole, 3-n-butyl-5-iso-propyl pyrazole, 3-iso-butyl-5-n-butyl pyrazole, 3-n-butyl-5-sec-butyl pyrazole, 3-n-butyl-5-tert-butyl pyrazole, 3,5-di-iso-propyl pyrazole, 3-iso-butyl-5-iso-propyl pyrazole, 3-sec-butyl-5-iso-propyl pyrazole, 3-tert-butyl-5-iso-propyl pyrazole, 3,5-di-iso-butyl pyrazole, 3-iso-butyl-5-sec-butyl pyrazole, 3-iso-butyl-5-tert-butyl pyrazole, 3,5-di-sec-butyl pyrazole, 3-sec-butyl-5-tert-butyl pyrazole and 3,5-di-tert-butyl pyrazole.

In one preferred embodiment the thermally active agent is a thermally active agent other than a triazole compound and/or an oxime, especially other than ketoximes and aldoximes and; in particular other than methyl ethyl ketoxime (MEKO).

The thermally active agent is preferably a 1,3 dicarbonyl compound, a pyrazole or imidazole, more preferably a malonate or a pyrazole compound, more preferably dimethylpyrazole, di-tert-butyl pyrazole, dimethyl malonate, diethyl malonate, Meldrum's acid or ethyl acetoacetate and most preferably dimethylpyrazole, diethyl malonate or dimethyl malonate.

The polyisocyanate compound used to prepare the blocked polyisocyanate may be, for example, but is not limited to ethylene diisocyanate, propylene diisocyanate, tetramethylene diisocyanate, hexamethylene diisocyanate (HDI), decamethylene diisocyanate, dodecamethylene diisocyanate, 2,4,4-trimethylhexamethylene-1,6 diisocyanate, phenylene diisocyanate, 2,4-diisocyanatotoluene, 2,6-diisocyanatotoluene, naphthylene diisocyanate, dianisidine diisocyanate, 4,4'-methylene-bis(phenyl isocyanate), 2,4'-methylene-bis(phenyl isocyanate), 4,4'-ethylene-bis(phenyl isocyanate), omega, omega'-diisocyanato-1,3-dimethyl benzene, cyclohexane diisocyanate, omega, omega'-diisocyanato-1,4-dimethyl cyclohexane, omega, omega'-diisocyanato-1,4-dimethyl benzene, omega, omega'-diisocyanato-1,3-dimethylcyclohexane, 1-methyl-2,4-diisocyanato cyclohexane, 4,4'-methylene-bis(cyclohexyl isocyanate), 3-isocyanato-methyl-3,5,5-trimethyl cyclohexyl isocyanate (isophorone diisocyanate, IPDI), dimer acid-diisocyanate, omega, omega'-diisocyanatodiethyl benzene, omega, omega'-diisocyanatodimethyl toluene, omega, omega'-diisocyanatodiethyl toluene, fumaric acid-bis(2-isocyanato ethyl) ester to triphenyl-methane-triisocyanate, 1,4-bis-(2-isocyanato-prop-2yl) benzene, 1,3-bis-(2-isocyanate prop-2yl) benzene. In one embodiment of the invention, the polyisocyanate is preferably free from isocyanate groups directly attached to aromatic nuclei. In another embodiment, the polyisocyanate may contain isocyanate groups directly attached to aromatic nuclei. In a preferred embodiment, the polyisocyanate is an aliphatic isocyanate, preferably derived from HDI.

The polyisocyanate can also be a polyisocyanate obtained by reaction of an excess amount of the isocyanate with a) water, b) a lower molecular weight polyol, (e.g. m.w.<=300) or c) a medium molecular weight polyol, e.g. a polyol of greater than 300 and less than 8000 m.w. (Mn), e.g. sucrose, or by the reaction of the isocyanate with itself to give an isocyanurate.

The lower molecular weight polyol comprises, for example, ethyleneglycol, propyleneglycol, 1,3-butylene glycol, neopentyl glycol, 2,2,4-trimethyl-1,3-pentane diol, hexamethylene glycol, cyclohexane dimethanol, hydrogenated bisphenol-A, trimethylol propane, trimethylol ethane, 1,2, 6-hexane triol, glycerine, sorbitol or pentaerythritol.

The polyisocyanate obtained by the above reaction may have a biuret structure, or an allophanate group. Especially preferred are general polyisocyanates with a biuret structure.

Also useful in the invention are the trimers of di- or higher polyisocyanates, i.e. materials containing an isocyanurate group.

Preferred polyisocyanates include HDI biuret, HDI trimer and IPDI trimer, especially a HDI biuret structure.

The blocked isocyanate is preferably present in the composition in a range of from 0.1 to 10 wt %, preferably 0.2 to 7 wt %, especially 0.3 to 5 wt %, most preferably 0.5 to 2 wt % of the total weight of the curable composition.

Furthermore, the curable composition contains at least one crystallization germ. The crystallization germ initiates, catalysis and/or speeds up the crystallization process of the curable composition, especially of the nitroso compound, as far the composition is applied as a primer coating and dries. The crystallization germ enables a fast crystallization and prevents that the applied compositions stays in a glassy or waxy state. Compositions with a crystallization germ start to crystallize after application during the drying process. This crystallization leads to scratch resistant surface of the primer coating. But at the same time, it was surprising that the crystallization germ and also the crystallization of the composition has no negative influence on the performance of the bonding, like on the adhesion or aging properties. In contrast, the highly scratch resistant surface protects the primer coating so that the bonded assemblies show even improved properties, especially in the event that the substrate coated with the curable composition has to be stored or transported prior bonding.

Furthermore, in connection with the crystallization the color of the applied composition changes. This color change can additionally be used as visual indicator for a complete drying of the curable composition, which is beneficial for the subsequent bonding process. Therefore, the crystallization not only improves the scratch resistance, but furthermore improves also the bonding process and therefore the achieved bonding properties.

Suitable as crystallization germ are especially at room temperature solid particles. The crystallization germ may be selected from metal particles, metal oxide particles, like aluminum oxide, glass particles or combinations. Preferably the crystallization germ is selected from aluminum oxide particles, glass particles or combinations. Most preferably glass particles, like glass powder, are used as crystallization germ. Glass particles showed the best behavior as crystallization germ for these compositions and also supported the adhesive properties the best.

The particles, especially the glass particles, used as crystallization germ have preferably a mean particle size of less than 100 µm, preferably less than 10 µm, more preferably less than 5 µm. In a preferred embodiment the a mean particle size of the particles used as crystallization germ, especially the glass particles, is between 0.01 to 100 µm, more preferably between 0.1 to 10 µm, more preferably between 0.5 to 5 µm.

As used herein, the term "average particle size" refers to the D50 value of the cumulative volume distribution curve at which 50% by volume of the particles have a diameter less than said value. The average particle size or D50 value is measured in the present invention through laser diffractometry preferably using a Malvern Mastersizer 2000 available from Malvern Instruments Ltd. In this technique, the size of particles in suspensions or emulsions is measured using the diffraction of a laser beam, based on application of either Fraunhofer or Mie theory. In the present invention, Mie theory or a modified Mie theory for non-spherical particles is applied and the average particle sizes or D50 values relate to scattering measurements at an angle from 0.02 to 135 degrees relative to the incident laser beam.

In another preferred embodiment, the particles, especially the glass particles, used as crystallization germ have preferably a maximal particle size of 200 µm, preferably 100 µm, more preferably 50 µm. This can be determined by a simple sieving process. The desired particles have no residue when sieved with a filter having the respective pore size.

Preferably, the solid particles or the material, of which the solid particles used as crystallization germ consist, have a Mohs' hardness of at least 2, preferably at least 4, more preferably at least 6.

The crystallization germ is preferably present in the composition in a range of from 0.01 to 5 wt %, preferably 0.01 to 2 wt %, especially 0.1 to 1 wt %, most preferably 0.2 to A 0.5 wt % of the total weight of the curable composition.

In an especially preferred embodiment, the curable composition contains additionally at least one hydrophobic silica, preferably a hydrophobic fumed silica. Such compositions show even more improved results in the steam resistant test. Hydrophobic silica is a form of silicon dioxide, commonly known as silica, that has hydrophobic groups chemically bonded to the surface. The hydrophobic groups are normally alkyl or polydimethylsiloxane chains. Hydrophobic silica can be processed in different ways; such as fumed silica, precipitated silica, and aerosol assisted self assembly, all existing in the form of nanoparticles. Suitable hydrophobizing agents for preparation of the hydrophobic silica (B2) are described in WO 2006/072407 (page 8, line 22 to page 12, line 20). Suitable methods for preparation of the hydrophobic silica (B2) are described in WO 2006/072407 (page 12, line 22 to page 15, line 20).

The hydrophobic silica is preferably a silica of a hydrophilicity which has been reduced by an additional treatment with a hydrophobizing agent after production in the hydrogen/oxygen gas flame. Since the hydrophobizing agent for preparation of the hydrophobic silica contains carbon, the hydrophobic silica has a carbon content of preferably more than 0.3% by weight, more preferably 0.5 to 15% by weight, most preferably 0.5 to 10% by weight.

The specific BET surface areas (measured to DIN 66131 and DIN 66132) of the hydrophobic silicas are preferably between 10 and 500 m2/g, more preferably between 30 and 400 m2/g, most preferably between 50 and 300 m2/g.

The silicas may occur in the form of hard sinter aggregates, which in turn form agglomerates. The mean particle sizes of the agglomerates of the silicas are preferably between 1 and 40 µm, more preferably between 5 and 25 µm, measured by laser diffraction on dispersions in a suitable solvent, for example, isopropanol. The mean particle sizes of the sinter aggregates of the silicas are preferably between 1 and 1000 nm, more preferably between 100 and 500 nm, and most preferably between 100 and 300 nm, measured by photon correlation spectroscopy.

The hydrophobic silicas, especially the hydrophobic fumed silicas, may be present in the composition of the invention in a range of from 2 to 25 wt %, preferably 3 to 20 wt %, most preferably 5 to 15 wt % of the total weight of the curable composition.

In another embodiment, the curable composition may contain a sulfur impregnated particulate solid which acts as a release agent for sulfur during the cure process. It is to be appreciated that the solid is not itself solid sulfur or particulate sulfur materials. Rather, the particulate solid material acts as a carrier material for the sulfur, which is impregnated therein. By solid, it is meant that the material is solid at a temperature of 22° C., and preferably solid at 50° C., 60° C., 70° C., 80° C. or 100° C. It should also be appreciated that impregnated sulfur means that the sulfur is releasably trapped within the particulate solid by means of, for example, dispersion, adsorption, trapping or immobilisation. It is preferred that the sulfur is impregnated within the particulate solid material by adsorption. Furthermore, impregnated means that the sulfur is dispersed throughout the particulate solid material, i.e., the majority of the sulfur is located within (inside) the particulate solid, but that minor amounts may be located at the surface of the particulate solid. It is also important to appreciate that sulfur release from the sulfur impregnated particulate solid is latent. The latency is thermal latency meaning that at room temperature (approx. 22° C.) the sulfur impregnated particulate solid does not release sufficient quantities of sulfur, but on heating the sulfur is released from the particulate solid material. It is to be appreciated that for sulfur release, there is no requirement for rupture or breakage of the particulate solid material to effect such release, application of sufficient heat is required to release the trapped sulfur. It should be appreciated at temperatures of above 50° C. a small amount of sulfur is released. Suitably, at temperatures of above 60° C., a greater quantity of sulfur is released. More suitably still, at temperatures of above 100° C., a greater quantity still of sulfur is released. It is to be appreciated that temperatures of above 120° C., provide an optimum quantity of sulfur is released. Selection of appropriate temperature allows the rate of release of sulfur to be controlled. The sulfur may be released by a diffusion process whereby the sulfur is released from its association with the particulate solid. Alternatively, sulfur may be released by a vaporisation process in which sulfur is typically sublimated at sufficiently elevated temperatures.

Desirably, the sulfur impregnated particulate solid used in the curable composition of the invention are latent sulfur releasing particulate solid. Typically, at room temperature (22° C.) little or no sulfur is released, whereby the sulfur releasing ability desirably increases at elevated temperatures, typically through a sublimation process. The particulate solid may be a solid, such as a granular solid, such as a powder. The particulate solid may be an amorphous solid.

Suitably, the sulfur content of the particulate solid used is in the range of from 0.5 to 20 wt % of the sulfur impregnated particulate solid, more preferably, from 1.0 to 15 wt % of the sulfur impregnated particulate solid. Suitably the sulfur content of the sulfur impregnated particulate solid used in the various improved compositions of the invention is 1.5 to 12 wt %. A particularly preferred sulfur content giving increased durability and bond resistance is 12 wt % of the sulfur impregnated particulate solid.

Suitably, the sulfur impregnated particulate solid used is in the range of from 0.1 to 10 wt % of the total weight of the curable composition, more preferably from 0.5 to 7 wt %, especially from 1 to 5 wt % of the total weight of the curable composition. Suitably, the sulfur impregnated particulate solid used in the various improved compositions of the invention is 2 to 3 wt % of the total weight of the curable composition.

The sulfur impregnated particulate solid of the invention has preferably an average particle size of from 1 to 200 μm. Suitably, the average particle size is less than 10 μm. As used herein, the term "average particle size" refers to the D50 value of the cumulative volume distribution curve at which 50% by volume of the particles have a diameter less than said value. The average particle size or D50 value is measured in the present invention through laser diffractometry preferably using a Malvern Mastersizer 2000 available from Malvern Instruments Ltd. In this technique, the size of particles in suspensions or emulsions is measured using the diffraction of a laser beam, based on application of either Fraunhofer or Mie theory. In the present invention, Mie theory or a modified Mie theory for non-spherical particles is applied and the average particle sizes or D50 values relate to scattering measurements at an angle from 0.02 to 135 degrees relative to the incident laser beam.

Desirably, the sulfur impregnated particulate solid used in the improved composition of the invention have a BET surface area of from 500 m2/g to 1200 m2/g, more suitably from 600 m2/g to 1100 m2/g, more suitably still from 700 m2/g to 1000 m2/g, as determined by the ASTM method D6556-10. Particularly good bond durability and bond resistance may be achieved with sulfur impregnated particulate solid having BET surface area of 700 m2/g and 1000 m2/g as determined by the ASTM method D6556-10.

Example of sulfur impregnated particulate solids include sulfur-impregnated clays, sulfur-impregnated silicates, sulfur-impregnated aluminates, sulfur-impregnated charcoals or sulfur-impregnated carbon materials such as carbon black.

Desirably, the sulfur-impregnated particulate solid is a sulfur impregnated carbon black or a sulfur impregnated charcoal. Preferably, the sulfur-impregnated particulate solid is at least one sulfur impregnated charcoal.

The sulfur-impregnated particulate solid may be formed by burning a suitable raw material, for example, coal or biomaterials, such as coconut husks, thereby forming a carbonaceous particulate material that has a suitable sulfur loading.

It should also be appreciated that a single grade of sulfur impregnated particulate solid or mixtures of at least two grades sulfur impregnated particulate solid (as discussed above for particle sizes, sulfur contents, surfaces areas) can be used in the improved compositions of the invention.

The provision of heat to the improved compositions of the invention may aid in the controllable release of the sulfur from the particles or particular of the improved curable compositions of the invention. Suitably, the composition may be cured at a temperature greater than 100° C., and suitably, between 120-200° C. Suitably, the composition may be heated to a temperature between 150-190° C.

In another embodiment, it might be desirable that the curable composition is substantially free of a sulfur impregnated particulate solid.

The composition may additionally comprise regular carbon blacks, which are preferably not sulfur impregnated.

Preferably the carbon black is substantially free of sulfur. The term "substantially free" means that the carbon black comprises less than 1 wt.-%, preferably less than 0.1 wt.-%, more preferably less than 0.01 wt.-%, and particularly preferably less than 0.001 wt.-% of sulfur, each based on the total amount of carbon black.

The carbon black can be exemplified by furnace blacks (furnace carbon blacks) such as SAF, ISAF, HAF, MAF, FEF, SRF, GPF, APF, FF, CF, SCF, and ECF; acetylene blacks (acetylene carbon blacks); thermal blacks (thermal carbon blacks) such as FT and MT; channel blacks (channel carbon blacks) such as EPC, MPC, and CC; and graphite. A single one of these may be used or two or more may be used in combination.

The nitrogen adsorption specific surface area of the carbon black is preferably 5 to 200 m2/g, while a lower limit of 50 m2/g and an upper limit of 150 m2/g are preferred. The dibutyl phthalate (DBP) absorption of the carbon black is preferably 5 to 300 mL/100 g, while a lower limit of 80 mL/100 g and an upper limit of 180 mL/100 g are preferred. The nitrogen adsorption specific surface area is measured according to ASTM D4820-93, and the DBP absorption is measured according to ASTM D2414-93.

Suitably, the carbon black used is in the range of from 0.1 to 10 wt % of the total weight of the curable composition, more preferably from 0.5 to 7 wt %, especially from 2 to 6 wt % of the total weight of the curable composition. Suitably, the carbon black used in the various improved compositions of the invention is 3 to 5 wt % of the total weight of the curable composition.

The carbon black can be used in combination or instead of a sulfur release agent to provide excellent properties. Both carbon black and the sulfur release agent have a positive effect on the aging resistance. Therefore, the compositions contain preferably at least one sulfur release agent and/or at least one carbon black. However, it might be preferred to use a carbon black instead of a sulfur-release agent. Surprisingly, compositions with a carbon black and without any sulfur-release agent gives also superior properties, especially according to the storage stability.

Additionally, the curable composition preferably contains at least one organic solvent. Examples of suitable organic solvents include aromatic and halogenated aromatic hydrocarbons such as benzene, ethylbenzene, toluene, xylene, chlorobenzene, and dichlorobenzene; non-halogenated and halogenated aliphatic hydrocarbons such as trichloroethylene, perchloroethylene, and propylene dichloride; ketones such as methyl ethyl ketone, and methyl isobutyl ketone; ethers, esters naphthas, etc., including mixtures of such solvents.

Preferred organic solvents are non-halogenated solvent. Especially preferred organic solvents are xylene and toluene, ethylbenzene, ethylacetate, methyl ethyl ketone and 1-methoxy-2-propylacetate.

The improved curable composition of the present invention can comprise any mixture of the aforementioned organic solvents, wherein mixtures of at least one aromatic solvent, like xylene, and at least one non-aromatic solvent, like ethylacetate, are preferred to ensure that a dry and non-tacky film is formed. The amount of organic solvent employed is preferably in the range of 30 to 98 percent by weight, more preferably in the range of 40 to 90 percent by weight, and particularly preferably in the range of 45 to 80 percent by weight, each based on the total amount of the inventive improved curable composition.

Preferably at least one organic solvent with a low evaporation point is used. These organic solvents can be used in combination with other solvents. Preferably at least one organic solvent has a evaporation point below 150° C., more preferably below 100° C., preferably below 80° C. Such a solvent is ethylacetate, with an evaporation point of 77° C.

Preferably the at least one organic solvent with a low evaporation point is used in the range of 15 to 60 percent by weight, more preferably in the range of 20 to 40 percent by weight, each based on the total amount of the inventive improved curable composition. Preferably in combination with an aromatic solvent, like xylene or toluene.

The amount of ethylacetate is preferably in the range of 15 to 60 percent by weight, more preferably in the range of 20 to 40 percent by weight, each based on the total amount of the inventive improved curable composition.

Suitably, certain improved compositions of the present invention may comprise additional silanes. These silanes are in addition to the nitroso silanes mentioned above. The additional silanes do preferably not have a nitroso moiety.

Exemplary silanes may be of the general formula:

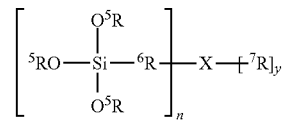

where:
n is either 1 or 2;
y=(2-n)
each $R^5$ can be selected from $C_1$-$C_{24}$ alkyl or $C_2$-$C_{24}$ acyl;
each $R^6$ can be selected from $C_1$-$C_{30}$ aliphatic groups, or substituted or unsubstituted $C_6$-$C_{30}$ aromatic groups;
$R^7$ can be selected from hydrogen, $C_1$-$C_{10}$ alkylene, $C_1$-$C_{10}$ alkylene substituted with one or more amino groups, $C_2$-$C_{10}$ alkenylene substituted with one or more amino groups, $C_6$-$C_{10}$ arylene, or $C_7$-$C_{20}$ alkarlyene;
X—$R^7$ is optional and X is either:

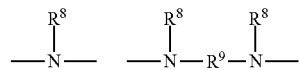

where each $R^8$ can be selected from hydrogen, $C_1$-$C_{30}$ aliphatic groups, or $C_6$-$C_{30}$ aromatic groups; and
$R^9$ can be selected from $C_1$-$C_{30}$ aliphatic groups, or $C_6$-$C_{30}$ aromatic groups; and
where when n=1, at least one of $R^3$ and $R^5$ is not hydrogen.

In one embodiment, X—$R^7$ is present. $R^5$ can be selected from $C_1$-$C_{24}$ alkyl, $R^6$ can be selected from $C_1$-$C_{30}$ aliphatic groups, X can be N—$R^8$ and $R^7$ can be selected from hydrogen or $C_1$-$C_{10}$ alkylene. As will be appreciated, when X—$R^7$ is absent the silane may be of the general formula (wherein $R_5$ and $R_6$ are as defined above):

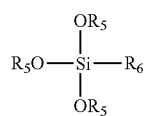

Preferred silanes include bis-silyl silanes such as those having two trisubstituted silyl groups. The substituents may be individually chosen from $C_1$-$C_{20}$ alkoxy, $C_6$-$C_{30}$ aryloxy and $C_2$-$C_{30}$ acyloxy. Suitable bis-silyl silanes for use in the improved compositions of the invention include:

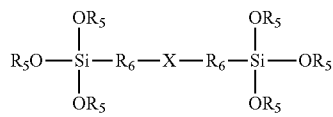

where:
  each $R_5$ can be selected from $C_1$-$C_{24}$ alkyl or $C_2$-$C_{24}$ acyl;
  each $R_6$ can be selected from $C_1$-$C_{20}$ aliphatic groups or $C_6$-$C_{30}$ aromatic groups;
  X is optional and is either:

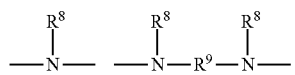

where each $R^8$ can be selected from hydrogen, $C_1$-$C_{20}$ aliphatic groups, or $C_6$-$C_{30}$ aromatic groups; and
  $R^9$ can be selected from $C_1$-$C_{20}$ aliphatic groups or $C_6$-$C_{30}$ aromatic groups.

In one embodiment, X is present. $R_5$ can be selected from $C_1$-$C_{24}$ alkyl, $R_6$ can be selected from $C_1$-$C_{30}$ aliphatic groups, and X can be N—$R^8$. As will be appreciated, when X is absent the bis-silane may be of the general formula (wherein $R_5$ and $R_6$ are as defined above):

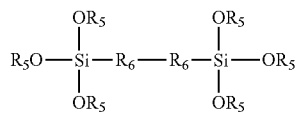

Examples of some bis-silyl aminosilanes used in the improved composition of the invention include: bis-(trimethoxysilylpropyl)amine, bis-(triethoxysilylpropyl) amine, bis-(triethoxysilylpropyl) ethylene diamine, N-[2-(vinylbenzylamino)ethyl]-3-aminopropyltrimethoxy silane, and aminoethyl-aminopropyltrimethoxy silane.

Such silanes may be included in the range from 1:3 to 3:1 relative to the nitrososilane compounds (stoichiometrically). As understood, such mixing of silanes and nitrososilanes can result in excellent bonding to substrates.

The total amount of additional silanes may be in the range of 1 to 10 wt % of the total composition. Suitably, the additional silanes may be present in an amount of 1 to 5 wt %, for example 1 to 3 wt %.

In particular, the inclusion of the amino bis(propyltrimethoxysilane) in addition to the nitrososilane significantly enhances the bond strength to the substrates. It is thought that the amino bis(propyltrimethoxysilane) has multiple functions within the formulation. This includes aiding the film forming and "wetting" of the substrate surfaces.

Generally, the final solution applied to the target substrate may vary in the total silane concentration and ratio (silane to nitrososilane) over a wide range and still provide beneficial results. The final solution should contain a total silane concentration of at least approximately 0.1% by volume, i.e., the concentration of the combination of silanes and nitrososilanes in the final solution. Solutions having a total silane concentration of between 0.1% and 10% by volume generally provide strong bonding without waste of valuable silanes.

The improved curable composition of the present invention further comprises preferably at least one epoxysilane having at least one terminal alkoxy silane group (hereinafter referred to as epoxysilane).

In one embodiment of the present invention the terminal alkoxy silane group of the epoxysilane is represented by formula)

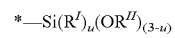

wherein u is 0, 1 or 2, each $R^I$ is independently selected from hydrogen, halogen, alkyl, cycloalkyl, alkenyl, aryl or acyl and each $R^{II}$ is independently selected from alkyl, cycloalkyl, alkenyl, aryl or acyl. In a particular preferred embodiment u is 0 and $R^{II}$ is selected from alkyl, wherein preferred alkyl groups include methyl, ethyl, n-propyl and iso-propyl.

Suitable terminal alkoxy silane groups include trimethoxysilane, triethoxysilane, tri-n-propoxysilane and/or tri-iso-propoxysilane groups.

To enhance the bonding properties of the improved curable composition of the present invention, it is advantageous that the epoxysilane, which is used in the improved curable composition of the present invention, is a non-polymeric compound, which means that the molecular weight of said epoxysilane is preferably less than 1000 g/mol, more preferably less than 750 g/mol, and particularly preferably less than 500 g/mol.

The epoxysilane contemplated for use in the practice of the present invention may be a monosilane. The term "monosilane", as used herein, refers to silane compounds having exactly one silicon atom per molecule, wherein monosilanes are preferred where three alkoxy residues are bound to the silicon atom.

Suitable epoxysilanes may be represented by following formula:

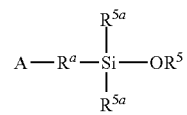

wherein $R^a$ is a divalent linkage group, comprising 1 to 24, preferably 2 to 20 and more preferably 3 to 10 carbon atoms, $R^{5a}$ independently of one another are selected from $C_{1-24}$ alkyl, such as $C_{1-5}$ alkyl, $C_{2-24}$ alkenyl, $C_{1-24}$ alkoxyl or $C_{3-24}$ acyl, and $R^5$ is selected from $C_{1-24}$ alkyl, such as $C_{1-5}$ alkyl or $C_{3-24}$ acyl, and A is either

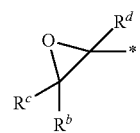

where $R^b$, $R^c$ and $R^d$ independently of one another are hydrogen or $C_{1-6}$ alkyl;
or

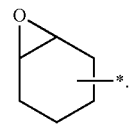

Desirably $R^b$, $R^c$ and $R^d$ are hydrogen.

The divalent linkage group $R^a$ can be a straight or branched alkylene group of 1 to 24, preferably of 2 to 20 and more preferably of 3 to 10 carbon atoms. Said alkylene group may be interrupted by at least one heteroatom, preferably selected from oxygen, sulfur or nitrogen.

It is further on preferred that $R^1$ and $R^3$ of formula (I) independently of one another are selected from $C_{1-5}$ alkoxyl, such as methoxy, ethoxy, n-propoxy or iso-propoxy, and/or $R^2$ of formula (I) is $C_{1-5}$ alkyl, such methyl, ethyl, n-propyl or iso-propyl. More preferably $R^1$ and $R^3$ of formula (I) are both selected from methoxy, ethoxy, n-propoxy or iso-propoxy and $R^2$ of formula (I) is methyl, ethyl, n-propyl or iso-propyl.

Particularly preferred epoxysilanes are represented by formula (II),

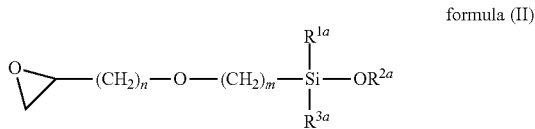

formula (II)

wherein n is an integer from 1 to 10, m is an integer from 0 to 14, $R^{1a}$ and $R^{3a}$ independently of one another are selected from $C_{1-24}$ alkyl, such as $C_{1-5}$ alkyl, $C_{2-24}$ alkenyl, $C_{1-24}$ alkoxyl or $C_{3-24}$ acyl, and $R^{2a}$ is selected from $C_{1-24}$ alkyl, such as $C_{1-5}$ alkyl or $C_{3-24}$ acyl. Desirably, n is 1, 2 or 3 and/or m is 2, 3 or 4, wherein it is particularly preferred that n is 1 and m is 3.

It is further on preferred that $R^{1a}$ and $R^{3a}$ of formula (II) independently of one another are selected from $C_{1-5}$ alkoxyl, such as methoxy, ethoxy, n-propoxy or iso-propoxy, and/or $R^{2a}$ of formula (II) is $C_{1-5}$ alkyl, such methyl, ethyl, n-propyl or iso-propyl. More preferably $R^{1a}$ and $R^{3a}$ of formula (II) are both selected from methoxy, ethoxy, n-propoxy or iso-propoxy and $R^{2'}$ of formulae (II) is methyl, ethyl, n-propyl or iso-propyl.

Other particularly preferred epoxysilane contemplated for use in the practice of the present invention are represented by formula (IIa),

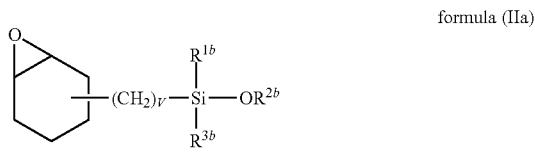

formula (IIa)

wherein v is an integer from 1 to 10, Rib and $R^{3b}$ independently of one another are selected from $C_{1-24}$ alkyl, such as $C_{1-5}$ alkyl, $C_{2-24}$ alkenyl, $C_{1-24}$ alkoxyl, such as $C_{1-5}$ alkoxyl or $C_{3-24}$ acyl, and $R^{2b}$ is selected from $C_{1-24}$ alkyl, such as or $C_{3-24}$ acyl. Desirably, v is 1, 2 or 3.

It is further on preferred that $R^{1b}$ and $R^{3b}$ of formula (IIa) independently of one another are selected from $C_{1-5}$ alkoxyl, such as methoxy, ethoxy, n-propoxy or iso-propoxy, and/or $R^{2b}$ of formula (IIa) is $C_{1-5}$ alkyl, such methyl, ethyl, n-propyl or iso-propyl. More preferably $R^{1b}$ and $R^{3b}$ of formula (IIa) are both selected from methoxy, ethoxy, n-propoxy or iso-propoxy and $R^{2''}$ of formulae (IIa) is methyl, ethyl, n-propyl or iso-propyl.

In one embodiment of the present invention the epoxysilane is selected from 3-glycidyloxypropyltrimethoxysilane (GLYMO), 3-glycidyloxypropyltriethoxysilane (GLYEO), 3-glycidyloxypropyltri-n-propoxysilane, 3-glycidyloxy-propyltri-iso-propoxysilane, 3-glycidyloxypropyltri-n-butoxysilane, 3-glycidyloxypropyltri-iso-butoxysilane, beta-(3,4-epoxycyclohexyl)-ethyltrimethoxysilane, beta-(3,4-epoxycyclohexyl)-ethyltriethoxysilane, beta-(3,4-epoxycyclohexyl)-ethyltri-n-propoxysilane, beta-(3,4-epoxycyclohexyl)-ethyltri-iso-propoxysilane, gamma-(3,4-epoxycyclohexyl)-propyltrimethoxysilane, gamma-(3,4-epoxycyclohexyl)-propyltriethoxysilane, gamma-(3,4-epoxycyclohexyl)-propyltri-n-propoxysilane, gamma-(3,4-epoxycyclohexyl)-propyltri-iso-propoxysilane and/or combinations thereof.

The aforementioned epoxysilanes are known in the art and are commercially available from various companies, including Evonik Industries AG, Wacker Chemie AG, Shin-Etsu Chemical and Gelest Inc.

A single epoxysilane or a mixture of two or more epoxysilanes can be used in the improved curable composition of the present invention.

To ensure sufficient adhesion to the substrate, especially to metal substrates, it is desirable that one or more epoxysilanes are present in an amount of 0.2 to 5 wt.-%, preferably in an amount of 0.5 to 2 wt.-%, and more preferably in an amount of 0.75 to 1.25 wt.-%, each based on the total amount of the improved curable composition of the present invention.

As mentioned above, the improved curable composition of the present invention further comprises preferably at least one bis-silane. The term "bis-silane", as used herein, refers to silane compounds having exactly two silicon atoms per molecule, wherein the two silicon atoms are linked with each other by a divalent linkage group and each silicon atom carries three additional substituents, wherein at least one of the three additional substituents is an alkyl or alkoxy residue. Consequently, the bis-silane used in the improved curable composition of the present invention comprises two terminal organo-silyl groups. Under the proviso that the bis-silane contemplated for use in the improved curable composition of the present invention comprises at least one terminal alkoxy silane group, as defined above, said bis-silane does not comprise at least one epoxy group.

In one embodiment of the present invention the terminal organo-silyl group of the bis-silane is represented by formula

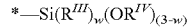

wherein w is 0, 1, 2 or 3, preferably w is 3, each $R^{III}$ is independently selected from hydrogen, halogen, alkyl, cycloalkyl, alkenyl, aryl or acyl and each $R^{IV}$ is independently selected from alkyl, cycloalkyl, alkenyl, aryl or acyl. In a particular preferred embodiment w is 0 and $R^{IV}$ is selected from alkyl, wherein preferred alkyl groups include methyl, ethyl, n-propyl and iso-propyl.

To enhance the bonding properties of the improved curable composition of the present invention, it is advantageous that the bis-silane, which is used in the improved curable composition of the present invention, is a non-polymeric compound, which means that the molecular weight of said bis-silane is preferably less than 1000 g/mol, more preferably less than 750 g/mol, and particularly preferably less than 500 g/mol.

Suitable bis-silanes contemplated for use in the improved curable composition of the present invention may be represented by formula (III),

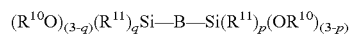

formula (III)

wherein p is 0 to 3, q is 0 to 3, B represents a divalent linkage group comprising 1 to 24 carbon atoms and at least one heteroatom selected from N, S or O, each $R^{10}$ is independently selected from hydrogen, halogen, $C_{1-24}$ alkyl, $C_{2-24}$ alkenyl, $C_{1-24}$ alkoxyl or $C_{3-24}$ acyl, and each $R^{11}$ is independently selected $C_{1-24}$ alkyl or $C_{3-24}$ acyl.

Particular good bonding and drying properties are achieved, when the divalent linkage group B of formula (HI) comprises one of the following structural elements:

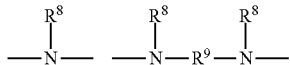

where each $R^8$ is independently selected from hydrogen, $C_{1-24}$ alkyl, such as $C_{1-4}$ alkyl, or $C_{6-18}$ aryl and $R^9$ is selected from $C_{1-24}$ alkylene or $C_{6-18}$ arylene; or

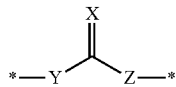

where Y is selected from O, S, and —$NR^{12}$—, Z is selected from O, S, and —$NR^{13}$—, wherein $R^{12}$ and $R^{13}$ independently of one another are selected from hydrogen or $C_{1-24}$ alkyl, such as $C_{1-4}$ alkyl, or $C_{6-18}$ aryl; X is the selected from O or S, with the proviso that Y and Z are not both O or S. Preferably Y is NH, Z is NH and X is O.

In an alternative embodiment the divalent linkage group B of formula (III) comprises the following structural element:

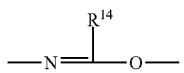

where $R^{14}$ is selected from $C_{1-24}$ alkyl, such as $C_{1-4}$ alkyl.

Preferred bis-silanes include those having two trisubstituted silyl groups. The substituents may individually be chosen from $C_{1-24}$ alkoxy, $C_{6-18}$ aryloxy and $C_{2-24}$ acyloxy.

Suitable bis-silanes for use within the present invention include those of formula (IV),

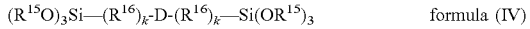

$(R^{15}O)_3Si—(R^{16})_k$-D-$(R^{16})_k$—$Si(OR^{15})_3$     formula (IV)

where k is 0 or 1, each $R^{15}$ is independently selected from $C_{1-4}$ alkyl or $C_{1-4}$ acyl and each $R^{16}$ is independently selected from $C_{1-6}$ alkylene or $C_{6-12}$ arylene, and D is selected from one of the following divalent groups:

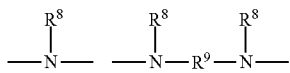

where each $R^8$ is independently selected from hydrogen, $C_{1-24}$ alkyl, such as $C_{1-4}$ alkyl, or $C_{6-18}$ aryl and $R^9$ is selected from $C_{1-24}$ alkylene or $C_{6-18}$ arylene;

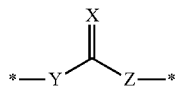

where Y is selected from O, S, and —$NR^{15}$—, Z is selected from O, S, and —$NR^{15}$—, wherein $R^{15}$ independently of one another are selected from hydrogen or $C_{1-24}$ alkyl, or $C_{6-18}$ aryl, and X is the selected from O or S, with the proviso that Y and Z are not both O or S. Preferably Y is NH, Z is NH and X is O.

Examples of suitable bis-silanes for use within the improved curable composition of the present invention include:

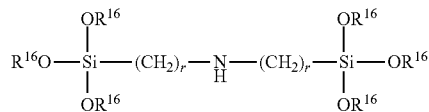

where r is from 1 to 10, such as from 1 to 4 and $R^{16}$ is selected from $C_{1-4}$ alkyl or $C_{1-4}$ acyl, and/or

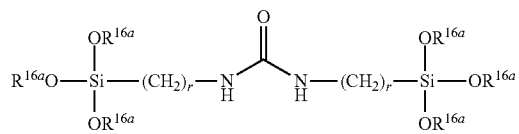

where r is from 1 to 10, such as from 1 to 4 and $R^{16a}$ is selected from $C_{1-4}$ alkyl or $C_{1-4}$ acyl.

In one embodiment of the present invention the bis-silane is selected from bis-(trimethoxysilylethyl)amine, bis-(triethoxysilylethyl)amine, bis-(tri-n-propoxysilylethyl)amine, bis-(tri-iso-propoxysilylethyl)amine, bis-(trimethoxysilylpropyl)amine, bis-(triethoxysilylpropyl)amine, bis-(tri-n-propoxysilylpropyl)amine, bis-(tri-iso-propoxysilylpropyl)amine, bis-(trimethoxysilylethyl)urea, bis-(triethoxysilylethyl)urea, bis-(tri-n-propoxysilylethyl) urea, bis-(tri-iso-propoxysilylethyl)urea, bis-(trimethoxysilylpropyl)urea, bis-(triethoxysilylpropyl)urea, bis-(tri-n-propoxysilylpropyl)urea, bis-(tri-iso-propoxysilylpropyl) urea, and/or combinations thereof. Preferably, bis-(trimethoxysilyl propyl) urea and/or bis-(trimethoxysilylpropyl)amine are used in the present invention, although other bis-silanes may also be used.

Other desirable bis-silanes include N,O-bis(trimethylsilyl)acetamide N,O-bis(triethylsilyl)acetamide, 1,3-bis(trimethylsilyl)urea, 1,3-bis(triethylsilyl)urea, 1,3-bis(trimethylsilyl)thiourea, 1,3-bis(triethylsilyl)thiourea, and/or mixtures thereof.

The aforementioned bis-silanes are known in the art and are commercially available from various companies, including Evonik Industries AG, Wacker Chemie AG, Shin-Etsu Chemical and Gelest Inc.

A single bis-silane or a mixture of two or more bis-silanes can be used in the improved curable composition of the present invention.

It is desirable that one or more bis-silanes are present in an amount of 0.1 to 3 wt.-%, preferably in an amount of 0.2 to 2 wt.-%, and more preferably in an amount of 0.4 to 1 wt.-%, each based on the total amount of the of improved curable composition of the present invention.

The bonding performance of the improved curable composition of the present invention can further be improved by using the following combinations of epoxysilanes and bis-silanes:

3-glycidyloxypropyltrimethoxysilane and bis-(trimethoxysilylpropyl)amine;

3-glycidyloxypropyltrimethoxysilane and bis-(trimethoxysilylpropyl)urea;
3-glycidyloxypropyltriethoxysilane and bis-(trimethoxysilylpropyl)amine;
3-glycidyloxypropyltriethoxysilane and bis-(trimethoxysilylpropyl)urea;
3-glycidyloxypropyltri-n-propoxysilane and bis-(trimethoxysilylpropyl)amine;
3-glycidyloxypropyltri-n-propoxysilane and bis-(trimethoxysilylpropyl)urea;
3-glycidyloxypropyltri-iso-propoxysilane and bis-(trimethoxysilylpropyl)amine;
3-glycidyloxypropyltri-iso-propoxysilane and bis-(trimethoxysilylpropyl)urea.

Particularly good bonding performances are achieved when the following combinations of epoxysilanes and bis-silanes are used in the amounts given, wherein each amount is based on the total amount of the improved curable composition of the present invention:

from 0.5 to 2 wt.-% of 3-glycidyloxypropyltrimethoxysilane and from 0.15 to 1 wt.-% of bis-(trimethoxysilylpropyl)amine;
from 0.5 to 2 wt.-% of 3-glycidyloxypropyltrimethoxysilane and from 0.15 to 1 wt.-% of bis-(trimethoxysilylpropyl)urea;
from 0.5 to 2 wt.-% of 3-glycidyloxypropyltriethoxysilane and from 0.15 to 1 wt.-% of bis-(trimethoxysilylpropyl)amine;
from 0.5 to 2 wt.-% of 3-glycidyloxypropyltriethoxysilane and from 0.15 to 1 wt.-% of bis-(trimethoxysilylpropyl)urea;
from 0.5 to 2 wt.-% of 3-glycidyloxypropyltri-n-propoxysilane and from 0.15 to 1 wt.-% of bis-(trimethoxysilylpropyl)amine;
from 0.5 to 2 wt.-% of 3-glycidyloxypropyltri-n-propoxysilane and from 0.15 to 1 wt.-% of bis-(trimethoxysilylpropyl)urea;
from 0.5 to 2 wt.-% of 3-glycidyloxypropyltri-iso-propoxysilane and from 0.15 to 1 wt.-% of bis-(trimethoxysilylpropyl)amine;
from 0.5 to 2 wt.-% of 3-glycidyloxypropyltri-iso-propoxysilane and from 0.15 to 1 wt.-% of bis-(trimethoxysilylpropyl)urea.

The epoxysilane and the bis-silane used in the present invention are preferably free and mobile components of the improved curable composition of the present invention, which means that said silane compounds are not immobilized on a carrier material, such as a solid surface.

As a further component the curable composition according to the invention preferably contains at least one hardener, especially at least one thermally activatable hardener.

A thermally activatable hardener is understood according to the invention to mean compounds that can be stored together with the epoxy resins for at least one month at 22° C. without the curing reaction starting to any significant extent. The molecular structure of the thermally activatable hardener preferably changes only above 80° C., in particular only above 100° C., so that these compounds act as a hardener above this temperature and initiate and/or accelerate the polymerization reaction of the epoxy resins.

The thermally activatable hardeners can be selected from e.g. the following compounds: guanidines, substituted guanidines, substituted ureas, melamine resins, guanamine derivatives, cyclic tertiary amines, aromatic amines and/or mixtures thereof. The hardeners can be incorporated into the curing reaction stoichiometrically, but they can also be catalytically active. Examples of substituted guanidines are methylguanidine, dimethylguanidine, trimethylguanidine, tetramethylguanidine, methylisobiguanidine, dimethyl-isobiguanidine, tetramethylisobiguanidine, hexamethylisobiguanidine, heptamethylisobiguanidine and most particularly cyanoguanidine (dicyandiamide). Alkylated benzoguanamine resins, benzoguanamine resins or methoxymethylethoxymethylbenzoguanamine may be mentioned as representatives of suitable guanamine derivatives. Furthermore, 3,3-diaminodiphenylsulfone and 4,4-diaminodiphenylsulfone and derivatives thereof as well as ionic liquids (imidazolium salts), such as for instance Baxxodur® ECX-2450, can be used as latent hardeners. Furthermore, the thermally activatable hardeners marketed with the trade names Ancamine® 2014, Ancamine® 2337, Adeka® EH-4357 and Adeka® EH-4360 are preferred according to the invention. Likewise, preferred are the products marketed by Ajinomoto with the trade name Ajicure®, in particular the products Ajicure® AH-300, Ajicure® PN23, Ajicure® PN50, Ajicure® MY24 and Ajicure® MY25. Microencapsulated systems, as marketed by Asahi Denka with the trade name Novacure®, are also preferred according to the invention. Dicyandiamide is most particularly preferably suitable as a thermally activatable hardener.

The thermally activatable hardeners, in particular dicyandiamide, are contained according to the invention preferably in a quantity from 1 to 15 wt. %, in particular from 2 to 10 wt. %, based in each case on the total application preparation.

In addition to the aforesaid hardeners, catalytically active substituted ureas can be employed according to the invention as curing accelerators. These are, in particular, p-chlorophenyl-N,N-dimethyl urea (monuron), 3-phenyl-1,1-dimethylurea (fenuron) or 3,4-dichlorophenyl-N,N-dimethyl urea (diuron). In principle, it is also possible to employ catalytically active tertiary acrylic amines or alkylamines, such as e.g. benzyldimethylamine, tris(dimethylamino)phenol, piperidine or piperidine derivatives. Furthermore, various, preferably solid imidazole derivatives can be employed as catalytically active curing accelerators. The following may be mentioned as representatives: 2-ethyl-2-methylimidazole, N-butylimidazole, benzimidazole and N—$C_1$ to $C_{12}$ alkylimidazoles or N-arylimidazoles. Furthermore, adducts of amino compounds to epoxy resins are suitable as cure-accelerating additions to the aforesaid hardeners. Suitable amino compounds are tertiary aliphatic, aromatic or cyclic amines. Suitable epoxy compounds are e.g. polyepoxides based on glycidyl ethers of bisphenol A or F or of resorcinol. Specific examples of these adducts are adducts of tertiary amines, such as 2-dimethylaminoethanol, N-substituted piperazines, N-substituted homopiperazines, N-substituted aminophenols, on di- or polyglycidyl ethers of bisphenol A or F or of resorcinol.

The curing accelerators for epoxy resins are contained according to the invention preferably in a quantity from 0 to 3 wt. %, in particular from 0.1 to 1.5 wt. %, based in each case on the total application preparation.

It will be appreciated by a person skilled in the art that the various improved curable compositions of the present invention may additionally comprise conventional additives such as fillers, pigments, stabilisers, and moisture scavengers, provided that the additives do not interfere with effective curing of the compositions. These include inactive fillers such as calcium carbonates, chalks, talcs, or metal oxides; accelerator systems; vulcanization retarders; promoters such as zinc oxide or stearic acid; plasticizers such as aromatic, paraffinic, naphthenic and synthetic mineral oils; ageing, light-protecting ozone-protecting, fatigue, coloration, and processing auxiliaries; and sulfur. Commonly these additives may be present at a quantity of 0.1 parts to 20 parts per 100 parts by weight of the composition.

The improved compositions of the present invention possess a number of advantages. For example, an improved curable composition may be formulated and stored. Such formulations are easily and conveniently applied to substrates in a standard manner. Furthermore, the improved compositions as so provided also achieve, on curing, excellent bond strengths to polymeric materials, such as elastomers, for example rubbers (natural or synthetic). For example, in rubber to metal bonding tests to determine the bond strength of the compositions of the present invention, the present composition show excellent bond strength and adhesion. Furthermore, the resultant bonds have a good hot water/steam resistance.

As used herein, the terms "elastomer", "elastomeric substrate" or "elastomeric material" are used interchangeably in the present invention. The terms preferably refer to a material that can undergo a substantial elongation and then returns to its approximately original dimensions upon release of the stress elongating the material. More preferably the elastomeric substrate has a permanent set of less than 50%, such as less than 30% or less than 10% after one minute when recovering from a strain of 100% applied for one minute at a temperature of 22° C.

In one embodiment the elastomer or elastomeric substrate may be selected from natural or synthetic rubbers, wherein the improved curable compositions of the present invention are particularly suitable for bonding polar rubbers, like nitrile butadiene rubbers (NBR), hydrogenated nitrile butadiene rubbers (HNBR) and/or ethylene acrylic elastomers to rigid substrates, such as metallic substrates. The synthetic rubber may be a nitrile butadiene rubber (HNBR). The polymer may be a C2-C1,000,000 polymer, such as a C2-C10,000 polymer. Other suitable polymers include those capable of reacting with nitroso groups so as to provide cross-links therebetween. Such a reaction produces a variety of cross-links, for example between the nitroso group and a rubber material. The materials of the invention are thought to reduce free nitroso groups as the nitroso group is within a molecular structure.

Suitably, the improved compositions of the invention may also be used in vulcanisation application as well as bonding of polymeric substrates, such as elastomeric substrates to any of a wide variety of useful materials, including for example other elastomers, non-elastomeric but flexible materials such as for example fabrics or films, and rigid materials such as plastics, engineering plastics, wood, metal, glass or other hydroxylated substrates. The improved compositions of the invention improve the adhesion provided by known compositions whereby durability of the bond between substrate is improved as a result of the presence of sulfur releasing particulate solid in the improved composition.

In examples utilising an elastomeric, such as a rubber substrate, the elastomer may be vulcanised or crosslinked prior to bonding to the second substrate. Alternatively, the elastomeric substrate may be vulcanised or crosslinked concurrently with bonding to the second substrate. The second substrate may be a metal. The nitroso aromatic compound of the composition of the present invention may become anchored to the elastomeric substrate.

On polymerisation, the nitroso groups of the compounds of the composition can react with polymers, in particular a polymer with diene or allylic functionality within the polymer chain. Reaction of a nitroso group and an allylic group on the polymer occurs via an alder-ene reaction. Such a reaction produces a variety of cross-links, for example between the nitroso group and an elastomeric material.

Suitably, the improved composition of the invention may be preferably used for bonding polar elastomeric materials, such as nitrile butadiene rubbers (NBR), hydrogenated nitrile butadiene rubbers (HNBR) and/or ethylene acrylic elastomers to metallic substrates.

In contrast to conventional systems, the improved compositions of the present invention can be applied to the unvulcanised rubber (as distinct from a metal or glass substrate), prior to vulcanisation and bond formation, and upon subsequent vulcanization a bond results. This means that the improved compositions may be applied to either the rubber or the metal or the hydroxylated surface. Conventional systems do not form a bond if applied in this manner. In this context, the crystallization of the primer coating and the associated color change can be taken as visual indictor of the drying. That means that as far the color change due to crystallization has been completed the used organic solvents are evaporated, which is beneficial for the next process step.

Alternatively, the improved compositions may be applied to a metal or a hydroxylated surface. This means that application to either the polymeric substrate such as a rubber or a metal or glass substrate or unvulcanised rubbers are both possible. Thus, a rubber substrate may be vulcanised or crosslinked prior to bonding to the metal or hydroxylated surface. The rubber substrate may be vulcanised or crosslinked concurrently with bonding to the metal surface.

The compositions of the present invention are coated in the range of 1 to 100 μm, preferably 10 to 60 μm, and more preferably in the range of 20 to 30 μm.

Generally, it is desirable that bonding is achieved during a vulcanisation step. Suitable vulcanisation methods include compression moulding, transfer moulding, injection moulding and autoclave heating, for example with steam or hot air. For example, semi-solid rubber can be injected into a mould. The semi-solid rubber is then cross-linked into a fully cured rubber and the bond with the substrate is formed at the same time.

Certain requirements must be fulfilled by a curing system in order to allow it to be successfully employed in a production environment. For example, the curing system must be easy to process. This means that it should be stable for use. Issues with the prior compositions have included a tendency to sediment. Accordingly, it is desirable that the curing system has a low tendency to sediment.

Furthermore, the curing system should be easy to apply. For example, it should be convenient to apply by any suitable dispensing system. It is also desirable that it dries quickly so that components can be handled without applied material running off and/or fouling production equipment. It is also desirable that the curing system shows good wetting properties for ease of application and spreading, for instance.

It is also desirable to have good curing strengths. This curing should be achieved independently of the type of elastomer (rubber) employed and also independently of the type of substrate. It will be appreciated that some rubbers are blended materials and accordingly it is desirable that good curing is achieved with such blended materials. Suitably consistent curing is achieved under various process parameters.

It is desirable that the bonds and in particular the substrate/substrate bond, such as rubber/metal joint, are durable under high pressure and even if exposed to an aggressive atmosphere, for example, water steam or a hot liquid such as oil. The bonds must also be durable against relatively high mechanical stress, under conditions involving any of high pressure, temperature and/or moisture. Advantageously, inclusion of the sulfur releasing particulate solid in these compositions increases bond durability and in particular under conditions of moisture and/or elevated temperatures or pressures.

The improved compositions of the invention can be easily applied at the interface between the polymer and the substrate and may assist in developing strong and durable bonds during the curing process.

The various improved compositions of the present invention may be utilised to bond a polymeric substrate as defined above to a second substrate, which may be an elastomer, a plastic, a metal or glass as defined above, especially metal.

Suitably, there is provided process for bonding a material to a substrate, comprising the steps of:
a) providing a curable composition as defined herein;
b) providing the material to be bonded in a non-cured form, and
c) simultaneously curing the composition and the material to be bonded so that the material is bonded to the substrate.

Suitably, the material to be bonded cures to form an elastomer, such as rubber.

In another aspect, there is provided process for bonding a first substrate to a second substrate, comprising the steps of:
a) providing a curable composition as defined herein;
b) applying the curable composition to at least one part of the surface of the first substrate, so that a primer coating is produced; and
c) contacting said surface of the first substrate with a surface of a second substrate, to which the cured composition is optionally applied, under conditions of heat and pressure sufficient to create a cured bond between the two substrates.

Preferably, the primer coating is dried during which the coating compositions crystallizes to from a scratch resistant surface. Preferably the primer coating has been stored, preferably at ambient conditions, for at least 1 hours, more preferably 5 hours, most preferably 10 hours. During this time the primer coating dries and crystallizes.

Desirably, in this process the first substrate is an elastomer which is vulcanised or crosslinked prior to bonding to the second substrate. Suitably, the first substrate is a rubber, and the second substrate is a metal surface. The rubber may be vulcanised or crosslinked concurrently with bonding to the metal surface.

Preferred in this process is especially that the first substrate is a metal, which is preferably bonded to an elastomer which is vulcanised or crosslinked prior to bonding. Suitably, the first substrate is a metal, and the second substrate is a rubber. The rubber may also be vulcanised or crosslinked concurrently with bonding to the metal surface.

In a preferred aspect, the present invention relates to a process for providing a coated substrate, which can be bond later to another substrate, comprising the steps of:
a) providing an curable composition as defined herein;
b) applying the curable composition as defined herein to at least one part of the surface of the substrate, so that a primer coating is produced; and let the coating dry and crystallize, preferably for at least 1 hours, more preferably 3 hours, most preferably 10 hours preferably at ambient condition (1 atm; 23° C.; 65% r.H.).

This coated substrate can safely be stored and transported, as it has a scratch resistant surface, and afterwards be bonded to another second substrate.

Suitably, the (first) substrate may be a rubber substrate which is vulcanised or crosslinked prior to bonding to the second substrate which is preferably a metal surface.

Suitably, the (first) substrate may be a metal which is preferably a rubber substrate as second substrate which is vulcanised or crosslinked prior to bonding.

The rubber may be also vulcanised or crosslinked concurrently with bonding to the metal surface.

Prior to bonding or applying the curable composition, the surface of the metallic substrate may be cleaned according to one or more methods known in the art, such as degreasing, grit-blasting and zinc-phosphatizing.

In one embodiment of the process of the present invention the first substrate may be a metallic substrate or plastic substrate and/or the second substrate may comprise or consist of an elastomeric material, like polar elastomeric materials, such as nitrile butadiene rubber (NBR), hydrogenated nitrile butadiene rubber (HNBR) and/or ethylene acrylic elastomers and/or any combination or mixture thereof.

In step b) of the process described above, the improved curable composition of the invention may be applied to at least one part of the surface of the first substrate, e.g., to at least one part of the metallic surface by spraying, dipping, brushing, and/or wiping. After the improved curable composition has been applied, the formed coating is permitted to dry. During this drying the composition crystallizes due to the presence of the crystallization germ. In a preferred embodiment the applied compositions are dried until a color change is observed, and preferably until the color does not change anymore. Preferably the applied composition is dried until the colour change due to crystallization has been completed. Due to the crystallization the color of the applied composition changes, which can be used as visual indicator of a complete drying. In some cases, it may be also be desirable to preheat the first substrate, such as the metallic substrate prior to application of the improved curable composition of the present invention to assist in drying of the improved curable composition.

Particularly durable improved curable composition bonds are obtained when the curable composition of the present invention is applied in an amount sufficient to form a film having a film thickness in the range of 3 µm to 20 µm, more preferably of 6 µm to 12 µm.

Then in step c) of the process of the present invention the surface of the first substrate is contacted with the surface the second substrate, to which the improved curable composition is optionally applied, under conditions of heat and pressure sufficient to create an improved curable composition bond between the two substrates.

In a preferred embodiment of the present invention the improved bond between the two substrates is formed in step c) of the process of the present invention results from bringing the two substrates together under a pressure from 20 MPa to 200 MPa, preferably from 25 MPa to 50 MPa at a temperature from 100° C. to 200° C., preferably from 160° C. to 190° C. The formed assembly should preferably remain under the applied pressure and temperature for a period of time of 1 min to 60 min, more preferably for a period of time of 3 min to 20 min.

The conditions of heat and pressure sufficient to create an improved bond between the two substrates could vary depending on the chemical composition of the improved curable composition of the present invention and/or depending on the vulcanization rate of the elastomeric substrate. In one embodiment of the present invention the elastomeric substrate is vulcanized concurrently with bonding to the surface of the metallic substrate in step c) of the inventive process.

In an alternative embodiment the elastomeric substrate is already vulcanized prior to the bonding process, which means that substantially no vulcanization of the elastomeric substrates occurs in step c) of the process of the present invention.

Generally, it is desirable that bonding is achieved during the vulcanization of the elastomeric substrate.

The process of the present invention may be carried out by applying an elastomeric substrate as a semi-molten material to an improved curable composition coated metal surface as in, for example, an injection-molding process. The process of the present invention may also be carried out by utilizing compression molding, transfer molding or autoclave curing techniques. After the process is complete, a bonded assembly is formed, in which the fully vulcanized elastomeric material is bonded to a metallic substrate by the cured product of the inventive improved curable composition of the invention, which comprises the sulfur impregnated particulate solid described above.

Therefore, another aspect of the present invention is an article coated with the curable composition as described above and an article or assembly comprising at least two substrates bound together by the cured product of the improved curable composition of present invention.

The article of the present invention is preferably a bonded assembly which comprises at least one plastic or metallic substrate, especially metallic substrate bonded to at least one elastomeric substrate by the cured product of improved curable composition of the invention, wherein the elastomeric substrate is preferably selected from nitrile butadiene rubber (NBR), hydrogenated nitrile butadiene rubber (HNBR) and/or ethylene acrylic elastomers.

The article or bonded assembly of the present invention is ready for use in a final application including, but not limiting to, engine mount, damper, or belting. A further aspect of the present invention is the use of an improved curable composition of the present invention for bonding a first substrate to a second substrate, wherein one substrate is an elastomeric substrate. Suitable metallic substrates and suitable polymeric substrate, elastomeric substrates, and polar elastomeric substrates are described above.

Examples

To test the scratch resistant properties and the adhesion performance of the cured composition, adhesives/primers having a composition according to the following table have been prepared. Flat plate head screws (mild steel) are degreased with ethyl acetate, sandblasted and again cleaned with ethyl acetate. Afterwards for each example the prepared adhesives/primers are applied by spray application onto the screws and dried. After 5 hours the crystallization and scratch resistance has been evaluated. Afterwards buffers are produced with the rubber type "Gumasol NR60" with an injection mold having a temperature of 160° C. Afterwards adhesion performance of the prepared buffers are tested with tensile testing machine and a combi test evaluating the aging properties.

|  | Comp. 1 | Example 1 |
|---|---|---|
| Ethylacetate | 33.4648 | 33.2148 |
| Xylene | 23.076 | 23.076 |
| Cellulose acetate butyrate[1] | 0.5 | 0.5 |
| Epoxy Resin2 | 3 | 3 |
| Glymo[3] | 1.13 | 1.13 |
| BSU[4] | 0.75 | 0.75 |
| Nitrososilan[5] | 25.2 | 25.2 |
| Carbon Black[6] | 4 | 4 |
| Hydrophobic Fumed Silica[7] | 7.8 | 7.8 |
| Blocked Isocyanate C[8] | 1 | 1 |
| Dicyandiamide | 0.072 | 0.072 |
| Dimethylphenylurea | 0.0072 | 0.0072 |
| Glass particle (particle size 5 μm) |  | 0.25 |
| Sum | 100 | 100 |

[1]Cellulose ester with high butyryl content and high viscosity (butyryl content 37 wt %; acetyl content 13.5 wt %; hydroxyl content 1.8 wt %)
[2]solid reaction product of bisphenol A and epichorohydrin; Epoxide Equivalent Weight 2500-4000 g/mol; Tg 152° C.
[3]Glymo = 3-Glycidoxyproplytrimethoxysilane
[4]BSU = N,N-bis(3-trimethoxysilylpropyl)urea
[5]Nitrososilan: 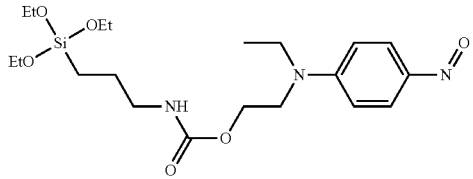
[6]Carbon Black; BET 80 m²/g (ASTM D6556)
[7]Hydrophobic Fumed Silica with a BET of 200 m²/g and a C-content of 2.3 to 3.2%
[8]Blocked isocyanate based on HDI; equivalent weight (calculated) 470; NCO blocked 8.9%; 70% solids in methoxypropylacetate While the inventive example with the glass particles as crystallisation germ shows a complete crystallization already after a few hours (less than 5 hours) at ambient conditions, the comparative example without any crystallisation germ does not fully crystallize even after several days (more than 10 days). While the comparative example still shows waxy and tacky areas, the inventive example provided a scratch resistant surface and maintained at the same time superior adhesion properties, especially with regard to aging performance.

What is claimed is:
1. A curable composition comprising
   a) at least one hydroxyl-group containing resin in a range of from 0.5 to 20 wt. % of the total weight of the curable composition,
   b) at least one nitroso-containing compound or at least one nitroso precursor compound in a range of from 1 to 60 wt. % of the total weight of the curable composition, wherein the at least one nitroso-containing compound or the at last one nitroso precursor compound is an aromatic nitroso-containing compound or an aromatic nitroso precursor compound comprising at least one alkoxy silane moiety and at least one moiety selected from an aromatic nitroso or an aromatic nitroso precursor or combinations thereof,
   c) at least one blocked isocyanate in a range of from 0.01 to 10 wt. % of the total weight of the curable composition,
   d) at least one crystallization germ in a range of from 0.01 to 5 wt. % of the total weight of the curable composition, the at least one crystallization germ including at least one of metal particles, metal oxide particles, and glass particles, wherein the metal particles, metal oxide particles, and glass particles, have a maximal particle size of 200 μm.

2. The curable composition of claim 1, wherein the at least one hydroxyl group-containing resin is a non-halogenated hydroxyl group-containing resin, selected from polyvinyl alcohol, polyvinyl butyral, polycellulose acetate butyrate, polyvinyl formal, polyamide, polyester, phenol resin, epoxy resin and phenoxy resin.

3. The curable composition of claim 1, wherein the hydroxy group-containing resin has a hydroxy content of from 1 to 35 wt % of the total weight of the hydroxy group-containing resin.

4. The curable composition of claim 1, further comprising at least one of hydrophobic silica or hydrophobic fumed silica which is present in the curable composition in a range of from 2 to 25 wt % of the total weight of the curable composition.

5. The curable composition of claim 1, wherein the glass particles are used as the crystallization germ and/or the particles used as the crystallization germ have a mean particle size of less than 100 μm.

6. The curable composition of claim 1, wherein the curable composition further contains additionally a carbon black.

7. The curable composition of claim 1, wherein the curable composition further contains an organic solvent.

8. A process for bonding a first substrate to a second substrate, comprising the steps of:
   a) providing the curable composition according to claim 1;
   b) applying the curable composition to at least one part of a surface of the first substrate and drying the applied composition; and
   c) contacting said surface of the first substrate with a surface of a second substrate, to which the curable composition is optionally also applied, under conditions of heat and pressure sufficient to create a cured bond between the two substrates.

9. The process of claim 8, wherein the applied composition is dried for at least 1 hour.

10. An article coated with the curable composition according to claim 1.

11. An assembly, comprising:
    a metallic substrate, and
    a natural or synthetic rubber bonded to the metallic substrate by a cured product of the curable composition according to claim 1.

12. The curable composition of claim 1, wherein the at least one crystallization germ consists of glass particles.

* * * * *